(12) United States Patent
Morioka et al.

(10) Patent No.: US 12,093,852 B2
(45) Date of Patent: Sep. 17, 2024

(54) VEHICLE USE TICKET ASSIGNMENT SYSTEM

(71) Applicant: NOMURA RESEARCH INSTITUTE, LTD., Tokyo (JP)

(72) Inventors: Taro Morioka, Tokyo (JP); Akira Arai, Tokyo (JP)

(73) Assignee: NOMURA RESEARCH INSTITUTE, LTD, Tokyo (JP)

( * ) Notice: Subject to any disclaimer, the term of this patent is extended or adjusted under 35 U.S.C. 154(b) by 18 days.

(21) Appl. No.: 17/976,075

(22) Filed: Oct. 28, 2022

(65) Prior Publication Data

US 2023/0153702 A1    May 18, 2023

(30) Foreign Application Priority Data

Nov. 17, 2021   (JP) .................................. 2021-187210

(51) Int. Cl.
    *G06Q 10/02*    (2012.01)
(52) U.S. Cl.
    CPC ................... *G06Q 10/02* (2013.01)
(58) Field of Classification Search
    CPC ...... G07B 15/00; G07C 9/27; G06Q 20/4015; G06Q 20/0457; G06Q 20/3224; G06Q 20/3278; G06Q 50/26; G06Q 2240/00; G01S 19/14
    USPC .......................................................... 705/5
    See application file for complete search history.

(56) References Cited

U.S. PATENT DOCUMENTS

| | | | |
|---|---|---|---|
| 8,954,860 B1 * | 2/2015 | Hands | G06F 16/954 |
| | | | 715/738 |
| 2013/0317884 A1 | 11/2013 | Chidlovskii | |
| 2017/0229045 A1 * | 8/2017 | Mukaiyama | G06Q 10/047 |
| 2018/0114150 A1 | 4/2018 | Morioka et al. | |

FOREIGN PATENT DOCUMENTS

| | | |
|---|---|---|
| EP | 3048567 A1 | 7/2016 |
| JP | 5982066 B1 | 8/2016 |
| WO | 2008/108666 A1 | 9/2008 |
| WO | 2012/070919 A1 | 5/2012 |

OTHER PUBLICATIONS

"Scenic route planning for tourists" Published by Springer Link (Year: 2017).*
Written Opinion dated Sep. 12, 2023, issued in counterpart FR application No. 2211806, with English translation. (15 pages).

* cited by examiner

*Primary Examiner* — Zeina Elchanti
(74) *Attorney, Agent, or Firm* — WHDA, LLP

(57) ABSTRACT

A vehicle use ticket assignment system for assigning a vehicle use ticket for a vehicle for which there is at least one fixed route and there is a fixed get-on/off enable point on the route is disclosed. The system receives a condition that includes a departure point and does not include a designation of a destination, and extracts a predetermined number of destination candidates that can be reached from the departure point by the at least one fixed route. After an application for a ticket for a vehicle is received from an information processing terminal, the system selects and assigns to the user one of boarding tickets to each of the extracted predetermined number of destination candidates based on a predetermined criterion.

7 Claims, 25 Drawing Sheets

FIG. 4

| | PAYMENT | |
|---|---|---|
| OUTWARD TRIP | SEPTEMBER 28 (TUESDAY) | EARLY MORNING |
| RETURN TRIP | SEPTEMBER 29 (WEDNESDAY) | EVENING |
| BOARDING STATION | TOKYO | |
| NUMBER OF PERSONS | ADULTS 4 PERSONS  CHILDREN 0 PERSONS | |

DESTINATION CANDIDATES (ARRIVAL STATIONS)

| NAGANO | NIIGATA | SENDAI | MORIOKA |

NECESSARY POINTS  6,000  POINTS PER PERSON FOR ROUND TRIP

SETTLE

※YOU CANNOT CANCEL

FIG. 5

| | | |
|---|---|---|
| ANNOUNCEMENT OF DESTINATION DECISION | | |
| OUTWARD TRIP | SEPTEMBER 28 (TUESDAY) | EARLY MORNING |
| RETURN TRIP | SEPTEMBER 29 (WEDNESDAY) | EVENING |
| BOARDING STATION | TOKYO | |
| NUMBER OF PERSONS | ADULTS 4 PERSONS  CHILDREN 0 PERSONS | |
| OUTWARD TRAIN | 7:05 TOKYO, YAMABIKO NO. X, 9:55 MORIOKA | |
| RETURN TRAIN | 17:50 MORIOKA, YAMABIKO NO. Y, 20:35 TOKYO | |

FIG. 6A

| | A STATION | B STATION | C STATION | D STATION | E STATION | F STATION | G STATION | V STATION | W STATION | X STATION | Y STATION | Z STATION |
|---|---|---|---|---|---|---|---|---|---|---|---|---|
| TRAIN 1 | ■ | ↑ | ○ | ↑ | ○ | ↑ | ↑ | ○ | ↑ | ● | | |
| TRAIN 2 | ■ | ↑ | ○ | ↑ | ○ | ↑ | ↑ | ○ | ↑ | ○ | ↑ | ● |
| TRAIN 3 | ■ | ↑ | ○ | ↑ | ○ | ↑ | ↑ | ↑ | ● | ○ | ○ | ○ |
| TRAIN 4 | ■ | ○ | ○ | ○ | ○ | ○ | ○ | ● | ○ | ○ | ○ | ○ |

| | A STATION | B STATION | C STATION | D STATION | E STATION | F STATION | G STATION | V STATION | W STATION | X STATION | Y STATION | Z STATION |
|---|---|---|---|---|---|---|---|---|---|---|---|---|
| TRAIN 1 | ■ | ↑ | ○ | ↑ | ○ | ↑ | ↑ | ○ | ↑ | ● | | |
| TRAIN 2 | ■ | ↑ | ○ | ↑ | ○ | ↑ | ↑ | ○ | ↑ | ○ | ↑ | ● |
| TRAIN 3 | ■ | ↑ | ○ | ↑ | ○ | ↑ | ↑ | ↑ | ● | ○ | ○ | ○ |
| TRAIN 4 | ■ | ○ | ○ | ○ | ○ | ○ | ○ | ● | ○ | ○ | ○ | ○ |
| TRAIN 4 | ↑ | ↑ | ↑ | ↑ | ↑ | ↑ | ↑ | ● | ↑ | ○ | ↑ | ○ |

FIG. 8A

| DATE | DEPARTURE TIME | TRAIN NAME | DEPARTURE STATION | TERMINAL STATION | VEHICLE | COMPOSITION | NUMBER OF STOCK SEATS |
|---|---|---|---|---|---|---|---|
| 9/28 | 06:04 | NO.101 | TOKYO | MORIOKA | E99 | 10CARS | 30 |
| 9/28 | 06:08 | NO.401 | TOKYO | NIIGATA | E99 | 10CARS | 15 |
| 9/28 | 06:12 | NO.301 | TOKYO | SHINJO | E99 | 10CARS | 30 |
| 9/28 | 06:16 | NO.501 | TOKYO | KANAZAWA | E88 | 10CARS | 10 |
| 9/28 | 06:20 | NO.102 | TOKYO | SENDAI | E88 | 10CARS | 10 |
| 9/28 | 06:28 | NO.502 | TOKYO | KANAZAWA | E88 | 10CARS | 10 |
| 9/28 | 06:32 | NO.601 | TOKYO | AKITA | E99 | 10CARS | 20 |
| 9/28 | 06:32 | NO.103 | TOKYO | SIN-HAKODATE-HOKUTO | E99 | 10CARS | 30 |
| 9/28 | 06:36 | NO.402 | TOKYO | ECHIGO-YUZAWA | E88 | 10CARS | 10 |
| 9/28 | 06:40 | NO.104 | TOKYO | SENDAI | E88 | 10CARS | 10 |
| 9/28 | 06:52 | NO.503 | TOKYO | NAGANO | E99 | 10CARS | 30 |
| 9/28 | 07:04 | NO.403 | TOKYO | NIIGATA | E99 | 10CARS | 30 |
| 9/28 | 07:08 | NO.105 | TOKYO | SHIN-AOMORI | E99 | 10CARS | 10 |
| 9/28 | 07:12 | NO.302 | TOKYO | SHINJO | E88 | 10CARS | 10 |

F I G. 8B

| DATE | ARRIVAL TIME | TRAIN NAME | DEPARTURE STATION | TERMINAL STATION | VEHICLE | COMPOSITION | NUMBER OF STOCK SEATS |
|---|---|---|---|---|---|---|---|
| 9/29 | 17:00 | NO.411 | NIIGATA | TOKYO | E99 | 10CARS | 30 |
| 9/29 | 17:04 | NO.111 | SIN-HAKODATE-HOKUTO | TOKYO | E88 | 10CARS | 10 |
| 9/29 | 17:04 | NO.611 | AKITA | TOKYO | E99 | 10CARS | 30 |
| 9/29 | 17:32 | NO.112 | SENDAI | TOKYO | E99 | 10CARS | 20 |
| 9/29 | 17:40 | NO.412 | NIIGATA | TOKYO | E88 | 10CARS | 10 |
| 9/29 | 17:48 | NO.113 | SENDAI | TOKYO | E88 | 10CARS | 10 |
| 9/29 | 17:52 | NO.511 | KANAZAWA | TOKYO | E99 | 10CARS | 10 |
| 9/29 | 18:00 | NO.413 | NIIGATA | TOKYO | E88 | 10CARS | 10 |
| 9/29 | 18:04 | NO.114 | SIN-HAKODATE-HOKUTO | TOKYO | E99 | 10CARS | 10 |
| 9/29 | 18:04 | NO.612 | AKITA | TOKYO | E88 | 10CARS | 10 |
| 9/29 | 18:28 | NO.512 | KANAZAWA | TOKYO | E88 | 10CARS | 10 |
| 9/29 | 18:40 | NO.414 | NIIGATA | TOKYO | E99 | 10CARS | 30 |

FIG. 9

| OUTWARD TRIP | A STATION | B STATION | C STATION | D STATION | E STATION | F STATION | G STATION | V STATION | W STATION | X STATION | Y STATION | Z STATION |
|---|---|---|---|---|---|---|---|---|---|---|---|---|
| TRAIN 1 | ○ | ↑ | ○ | ↑ | ○ | ↑ | ↑ | ○ | ↑ | ○ | | |
| TRAIN 2 | ○ | ↑ | ○ | ↑ | ○ | ↑ | ↑ | ○ | ↑ | ○ | ↑ | ○ |
| TRAIN 3 | ○ | ↑ | ○ | ↑ | ○ | ↑ | ↑ | ↑ | ○ | ○ | ○ | ○ |

| RETURN TRIP | A STATION | B STATION | C STATION | D STATION | E STATION | F STATION | G STATION | V STATION | W STATION | X STATION | Y STATION | Z STATION |
|---|---|---|---|---|---|---|---|---|---|---|---|---|
| TRAIN a | ○ | ↓ | ○ | ↓ | ○ | ↓ | ↓ | ○ | ↓ | ○ | ↓ | ○ |
| TRAIN b | ○ | ↓ | ○ | ↓ | ○ | ○ | ○ | ○ | ○ | ○ | | |
| TRAIN c | ○ | ↓ | ○ | ↓ | ○ | ↓ | ↓ | ↓ | ↓ | ○ | ↓ | ○ |
| | ○ | | ○ | | ○ | | ○ | ○ | ○ | ○ | | ○ |

| WEIGHT | STOP STATION | | | | | | |
|---|---|---|---|---|---|---|---|
| | A STATION | C STATION | E STATION | V STATION | W STATION | X STATION | Z STATION |
| STATION-SPECIFIC | 1 | 1 | 1 | 3 | 2 | 1 | 2 |
| MONTH-SPECIFIC | 3 | 3 | 3 | 2 | 2 | 1 | 1 |
| DAY-OF-WEEK-SPECIFIC | 2 | 2 | 1 | 1 | 2 | 2 | 2 |
| INDIVIDUAL-SPECIFIC | 5 | 5 | 5 | 1 | 5 | 5 | 4 |
| MULTIPLICATION | 30 | 30 | 15 | 6 | 40 | 10 | 16 |

F I G. 12A

| DATE | DEPARTURE TIME | TRAIN NAME | DEPARTURE STATION | CANDIDATE STATION | TERMINAL STATION | NUMBER OF STOCK SEATS |
|---|---|---|---|---|---|---|
| 9/28 | 06:04 | NO.101 | TOKYO | SENDAI | MORIOKA | 30 |
| 9/28 | 06:32 | NO.601 | TOKYO | SENDAI | AKITA | 20 |
| 9/28 | 07:08 | NO.105 | TOKYO | SENDAI | SHIN-AOMORI | 10 |
| 9/28 | 06:04 | NO.101 | TOKYO | MORIOKA | MORIOKA | 30 |
| 9/28 | 06:32 | NO.601 | TOKYO | MORIOKA | AKITA | 20 |
| 9/28 | 07:08 | NO.105 | TOKYO | MORIOKA | SHIN-AOMORI | 10 |
| 9/28 | 06:08 | NO.401 | TOKYO | NIIGATA | NIIGATA | 15 |
| 9/28 | 07:04 | NO.403 | TOKYO | NIIGATA | NIIGATA | 30 |
| 9/28 | 06:52 | NO.503 | TOKYO | NAGANO | NAGANO | 30 |

FIG. 12B

| DATE | ARRIVAL TIME | TRAIN NAME | DEPARTURE STATION | CANDIDATE STATION | TERMINAL STATION | NUMBER OF STOCK SEATS |
|---|---|---|---|---|---|---|
| 9/29 | 17:04 | NO.611 | AKITA | SENDAI | TOKYO | 30 |
| 9/29 | 17:32 | NO.112 | SENDAI | SENDAI | TOKYO | 20 |
| 9/29 | 18:04 | NO.114 | SIN-HAKODATE-HOKUTO | SENDAI | TOKYO | 20 |
| 9/29 | 17:04 | NO.611 | AKITA | MORIOKA | TOKYO | 30 |
| 9/29 | 18:04 | NO.114 | SIN-HAKODATE-HOKUTO | MORIOKA | TOKYO | 20 |
| 9/29 | 17:07 | NO.411 | NIIGATA | NIIGATA | TOKYO | 30 |
| 9/29 | 18:40 | NO.414 | NIIGATA | NIIGATA | TOKYO | 30 |
| 9/29 | 17:52 | NO.511 | KANAZAWA | NAGANO | TOKYO | 10 |

F I G. 13A

| | | | OUTWARD TRIP | | |
|---|---|---|---|---|---|
| DATE | DEPARTURE TIME | TRAIN NAME | CANDIDATE STATION | TERMINAL STATION | NUMBER OF STOCK SEATS |
| 9/28 | 06:04 | NO.101 | SENDAI | MORIOKA | 30 |
| 9/28 | 06:04 | NO.101 | SENDAI | MORIOKA | 30 |
| 9/28 | 06:04 | NO.101 | SENDAI | MORIOKA | 30 |
| 9/28 | 06:32 | NO.601 | SENDAI | AKITA | 20 |
| 9/28 | 06:32 | NO.601 | SENDAI | AKITA | 20 |
| 9/28 | 06:32 | NO.601 | SENDAI | AKITA | 20 |
| 9/28 | 07:08 | NO.105 | SENDAI | SHIN-AOMORI | 10 |
| 9/28 | 07:08 | NO.105 | SENDAI | SHIN-AOMORI | 10 |
| 9/28 | 07:08 | NO.105 | SENDAI | SHIN-AOMORI | 10 |
| 9/28 | 06:04 | NO.101 | MORIOKA | MORIOKA | 30 |
| 9/28 | 06:04 | NO.101 | MORIOKA | MORIOKA | 30 |
| 9/28 | 06:32 | NO.601 | MORIOKA | AKITA | 20 |
| 9/28 | 06:32 | NO.601 | MORIOKA | AKITA | 20 |
| 9/28 | 07:08 | NO.105 | MORIOKA | SHIN-AOMORI | 10 |
| 9/28 | 07:08 | NO.105 | MORIOKA | SHIN-AOMORI | 10 |
| 9/28 | 06:08 | NO.401 | NIIGATA | NIIGATA | 15 |
| 9/28 | 06:08 | NO.401 | NIIGATA | NIIGATA | 15 |
| 9/28 | 07:04 | NO.403 | NIIGATA | NIIGATA | 30 |
| 9/28 | 07:04 | NO.403 | NIIGATA | NIIGATA | 30 |
| 9/28 | 06:52 | NO.503 | NAGANO | NAGANO | 30 |

F I G. 13B

| DATE | DEPARTURE TIME | TRAIN NAME | RETURN TRIP | | | NUMBER OF STOCK SEATS |
|---|---|---|---|---|---|---|
| | | | DEPARTURE STATION | CANDIDATE STATION | | |
| 9/29 | 17:04 | NO.611 | AKITA | SENDAI | | 30 |
| 9/29 | 17:32 | NO.112 | SENDAI | SENDAI | | 20 |
| 9/29 | 18:04 | NO.114 | SIN-HAKODATE-HOKUTO | SENDAI | | 10 |
| 9/29 | 17:04 | NO.611 | AKITA | SENDAI | | 30 |
| 9/29 | 17:32 | NO.112 | SENDAI | SENDAI | | 20 |
| 9/29 | 18:04 | NO.114 | SIN-HAKODATE-HOKUTO | SENDAI | | 10 |
| 9/29 | 17:04 | NO.611 | AKITA | SENDAI | | 30 |
| 9/29 | 17:32 | NO.112 | SENDAI | SENDAI | | 20 |
| 9/29 | 18:04 | NO.114 | SIN-HAKODATE-HOKUTO | SENDAI | | 10 |
| 9/29 | 17:04 | NO.611 | AKITA | MORIOKA | | 30 |
| 9/29 | 18:04 | NO.114 | SIN-HAKODATE-HOKUTO | MORIOKA | | 20 |
| 9/29 | 17:04 | NO.611 | AKITA | MORIOKA | | 30 |
| 9/29 | 18:04 | NO.114 | SIN-HAKODATE-HOKUTO | MORIOKA | | 20 |
| 9/29 | 17:07 | NO.411 | NIIGATA | NIIGATA | | 30 |
| 9/29 | 18:40 | NO.414 | NIIGATA | NIIGATA | | 30 |
| 9/29 | 17:07 | NO.411 | NIIGATA | NIIGATA | | 30 |
| 9/29 | 18:40 | NO.414 | NIIGATA | NIIGATA | | 30 |
| 9/29 | 17:52 | NO.511 | KANAZAWA | NAGANO | | 10 |

F I G. 17
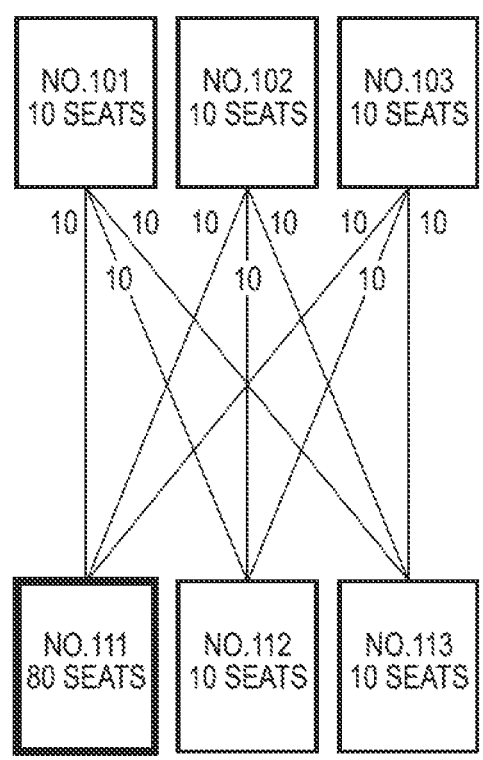

F I G. 19A

| STATION | SENDAI | | MORIOKA | | | NIIGATA | | NAGANO |
|---|---|---|---|---|---|---|---|---|
| TRAIN NAME | NO.101 | NO.601 | NO.105 | NO.101 | NO.601 | NO.105 | NO.401 | NO.403 | NO.503 |
| NUMBER OF STOCK SEATS | 30 | 20 | 10 | 30 | 20 | 10 | 15 | 30 | 30 |
| LOTTERY PROBABILITY | 15.4% | 10.3% | 5.1% | 15.4% | 10.3% | 5.1% | 7.7% | 15.4% | 15.4% |

F I G. 19B

| STATION | SENDAI | | MORIOKA | | | NIIGATA | | NAGANO |
|---|---|---|---|---|---|---|---|---|
| TRAIN NAME | NO.611 | NO.112 | NO.114 | NO.611 | NO.114 | — | NO.411 | NO.415 | NO.511 |
| NUMBER OF STOCK SEATS | 30 | 20 | 10 | 30 | 10 | — | 30 | 30 | 10 |
| LOTTERY PROBABILITY | 17.6% | 11.8% | 5.9% | 17.6% | 5.9% | — | 17.6% | 17.6% | 5.9% |

FIG. 20A

| STATION | SENDAI | | |
|---|---|---|---|
| TRAIN NAME | NO.101 | NO.601 | NO.105 |
| NO.611 | 900 / 25.0% | 600 / 16.7% | 300 / 8.3% |
| NO.112 | 600 / 16.7% | 400 / 11.1% | 200 / 5.6% |
| NO.114 | 300 / 8.3% | 200 / 5.6% | 100 / 2.8% |

$\times \dfrac{60}{155} =$

| STATION | SENDAI | | |
|---|---|---|---|
| TRAIN NAME | NO.101 | NO.601 | NO.105 |
| NO.611 | 9.7% | 6.5% | 3.2% |
| NO.112 | 6.5% | 4.3% | 2.2% |
| NO.114 | 3.2% | 2.2% | 1.1% |

FIG. 20B

| STATION | MORIOKA | | |
|---|---|---|---|
| TRAIN NAME | NO.101 | NO.601 | NO.105 |
| NO.611 | 900 / 37.5% | 600 / 25.0% | 300 / 12.5% |
| NO.114 | 300 / 12.5% | 200 / 8.3% | 100 / 4.2% |

$\times \dfrac{40}{155} =$

| STATION | MORIOKA | | |
|---|---|---|---|
| TRAIN NAME | NO.101 | NO.601 | NO.105 |
| NO.611 | 9.7% | 6.5% | 3.2% |
| NO.114 | 3.2% | 2.2% | 1.1% |

FIG. 20C

| STATION | NIIGATA | |
|---|---|---|
| TRAIN NAME | NO.401 | NO.403 |
| NO.411 | 450 | 900 |
| | 16.7% | 33.3% |
| NO.414 | 450 | 900 |
| | 16.7% | 33.3% |

$\times \dfrac{45}{155} =$

| STATION | NIIGATA | |
|---|---|---|
| TRAIN NAME | NO.411 | NO.414 |
| NO.411 | 4.8% | 9.7% |
| NO.414 | 4.8% | 9.7% |

FIG. 20D

| STATION | NAGANO |
|---|---|
| TRAIN NAME | NO.503 |
| NO.511 | 300 |
| | 100% |

$\times \dfrac{10}{155} =$

| STATION | NAGANO |
|---|---|
| TRAIN NAME | NO.511 |
| NO.511 | 6.5% |

FIG. 21A

| STATION | SENDAI | | MORIOKA | | | NIIGATA | | NAGANO |
|---|---|---|---|---|---|---|---|---|
| TRAIN NAME | NO.101 | NO.801 | NO.105 | NO.101 | NO.801 | NO.105 | NO.401 | NO.403 | NO.503 |
| NUMBER OF STOCK SEATS | 30 | 20 | 10 | 30 | 20 | 10 | 15 | 30 | 30 |
| LOTTERY PROBABILITY | 19.4% | 13.0% | 6.5% | 12.9% | 8.7% | 4.3% | 9.6% | 19.4% | 6.5% |

FIG. 21B

| STATION | SENDAI | | MORIOKA | | | NIIGATA | | NAGANO |
|---|---|---|---|---|---|---|---|---|
| TRAIN NAME | NO.611 | NO.112 | NO.114 | NO.611 | NO.114 | — | NO.411 | NO.414 | NO.511 |
| NUMBER OF STOCK SEATS | 30 | 20 | 10 | 30 | 10 | — | 30 | 30 | 10 |
| LOTTERY PROBABILITY | 19.4% | 13.0% | 6.5% | 19.4% | 6.5% | — | 14.5% | 14.5% | 6.5% |

FIG. 23

V STATION

| PRIORITY ORDER | PRIORITY LEVEL | OUTWARD TRIP | RETURN TRIP |
|---|---|---|---|
| 1 | 100 | NO.101 | NO.111 |
| 2 | 90 | NO.101 | NO.112 |
| 3 | 80 | NO.103 | NO.116 |
| 4 | 70 | NO.101 | NO.116 |
| 5 | ... | ... | ... |

W STATION

| PRIORITY ORDER | PRIORITY LEVEL | OUTWARD TRIP | RETURN TRIP |
|---|---|---|---|
| 1 | 95 | NO.201 | NO.211 |
| 2 | 85 | NO.201 | NO.214 |
| 3 | 30 | NO.203 | NO.216 |
| 4 | 20 | NO.201 | NO.216 |
| 5 | ... | ... | ... |

X STATION

| PRIORITY ORDER | PRIORITY LEVEL | OUTWARD TRIP | RETURN TRIP |
|---|---|---|---|
| 1 | 50 | NO.301 | NO.311 |
| 2 | 40 | NO.301 | NO.314 |
| 3 | 30 | NO.303 | NO.315 |
| 4 | 20 | NO.302 | NO.313 |
| 5 | ... | ... | ... |

Y STATION

| PRIORITY ORDER | PRIORITY LEVEL | OUTWARD TRIP | RETURN TRIP |
|---|---|---|---|
| 1 | 75 | NO.401 | NO.411 |
| 2 | 65 | NO.402 | NO.414 |
| 3 | 40 | NO.403 | NO.416 |
| 4 | 30 | NO.402 | NO.411 |
| 5 | ... | ... | ... |

| PRIORITY ORDER | PRIORITY LEVEL | OUTWARD TRIP | RETURN TRIP |
|---|---|---|---|
| 1 | 100 | NO.101 | NO.111 |
| 1 | 95 | NO.201 | NO.211 |
| 1 | 75 | NO.401 | NO.411 |
| 1 | 50 | NO.301 | NO.311 |

VEHICLE USE TICKET ASSIGNMENT SYSTEM

CROSS-REFERENCE TO RELATED APPLICATION(S)

This application claims priority to and the benefit of Japanese Patent Application No. 2021-187210 filed on Nov. 17, 2021, the entire disclosure of which is incorporated herein by reference.

BACKGROUND OF THE INVENTION

Field of the Invention

The present invention relates to a technique for assigning a use ticket of a vehicle by sales or the like and, more particularly, to an effective technique applied to a destination proposal type vehicle use ticket assignment system.

Description of the Related Art

For example, Japanese Patent No. 5982066 describes, concerning sales of air tickets, an air ticket sales system configured to implement a destination proposal type sales method of extracting a plurality of destination candidates based on conditions such as a departure point, a date/time, and the number of persons designated by a user and automatically deciding a final destination and a flight from the candidates by lottery, instead of allowing the user to directly designate a destination and a flight and reserve/purchase. This allows an airline company to promote stock (vacant seats) sales by preferentially extracting, as a candidate site, the destination of a flight that the company wants to sell. In addition, the user can purchase an air ticket at a low price and make a trip. Also, since the final destination is not finalized at the time of purchase, the user can experience unexpectedness and expectation for the trip.

It is possible to consider applying the same destination-proposal type sales method as the conventional technique to sales of tickets for a Shinkansen train, a limited express train, or the like. In this case, there is a problem unique to the characteristics of railway networks.

In the case a flight, once the airplane departs, no one can get off until arrival. Hence, assuming that connecting flights are excluded, and an airport reachable by one flight is set to the destination, once the airport of the destination is specified, there is no room for the user to fly to an airport other than the concerned destination. Hence, if a plurality of different airports are extracted as destination candidates, the user will necessarily fly to a different destination depending on which one of the destinations is selected by lottery.

On the other hand, if the moving means (vehicle) is a railway, even if the system designates the destination station, the user can make a stopover, and it is therefore impossible to preclude the possibility of the user making a stopover and going to another unintended station.

SUMMARY OF THE INVENTION

The present invention provides a vehicle use ticket assignment system that assigns a use ticket such as a train ticket by sales or the like using a destination proposal type method in a moving means (vehicle) such as a railway that allows a user to make a stopover.

A representative invention disclosed in the present application is as follows.

According to one aspect of the present disclosure, a vehicle use ticket assignment system for assigning a vehicle use ticket for a vehicle for which there is at least one fixed route and there is a fixed get-on/off enable point on the route, the system comprises: a processor and a memory storing a program configured to be executed by the processor, wherein the program includes instructions for executing a method, the method comprising: receiving, via a condition setting screen displayed on an information processing terminal, a condition that is from a user and that includes a departure point and does not include a designation of a destination; extracting a predetermined number of destination candidates that can be reached from the departure point by the at least one fixed route, wherein the predetermined number of destination candidates are extracted by the processor such that for all of the destination candidates, there is no shared get-on/off enable point on the route to the destination candidate; causing a screen displaying the extracted predetermined number of destination candidates to be displayed on the information processing terminal; and after an application for a ticket for a vehicle is received via a screen for ordering the ticket for the vehicle including the display of the predetermined number of destination candidates which is displayed on the information processing terminal, based on a predetermined criterion, selecting and assigning to the user one of boarding tickets to each of the extracted predetermined number of destination candidates.

Further features of the present invention will become apparent from the description of this specification and the accompanying drawings.

BRIEF DESCRIPTION OF THE DRAWINGS

FIG. 4 is a view showing the outline of an example of a screen displayed on the user terminal by the train ticket sales server according to the embodiment of the present invention;

FIG. 5 is a view showing the outline of an example of a screen displayed on the user terminal by the train ticket sales server according to the embodiment of the present invention;

FIGS. 6A and 6B are views showing the outline of an example of decision of a destination according to the embodiment of the present invention;

FIGS. 8A and 8B are views showing the outline of detailed examples of applicable train lists according to the embodiment of the present invention;

FIG. 9 is a view showing the outline of examples of applicable stop station lists according to the embodiment of the present invention;

FIGS. 12A and 12B are views showing the outline of detailed examples of a candidate train list according to the embodiment of the present invention;

FIGS. 13A and 13B are views showing the outline of a detailed example of a candidate train list according to the embodiment of the present invention;

FIG. 17 is a view showing the outline of an example in which an order is decided for a plurality of outward/return trains in the same station according to the embodiment of the present invention;

FIGS. 19A and 19B are views showing the outline of an example of a lottery probability in a case where a weight is set for each train by the first method according to the embodiment of the present invention;

FIGS. 20A to 20D are views showing the outline of an example of lottery probabilities in a case where a weight is set for each train by the third method according to the embodiment of the present invention;

FIGS. 21A and 21B are views showing the outline of an example of lottery probabilities in a case where a weight is set for each train by the third method according to the embodiment of the present invention;

FIG. 23 is a view showing an example in which the order of outward/return trains is decided from the combinations of trains on the outward trip and the return trip by a fourth method according to the embodiment of the present invention.

DESCRIPTION OF THE EMBODIMENTS

Figure 1:
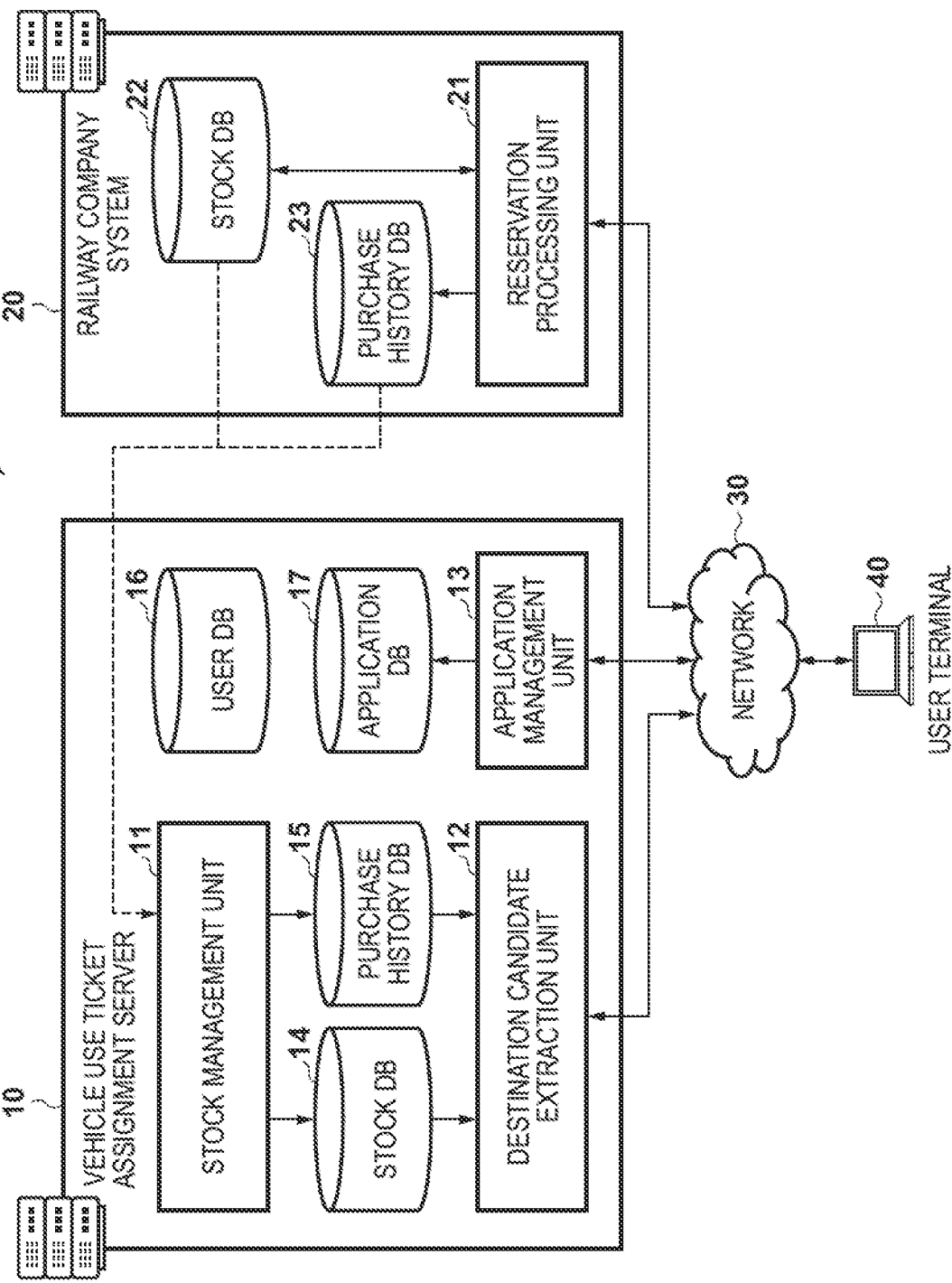
FIG. 1 is a block diagram showing the outline of a configuration example of a train ticket sales system according to an embodiment of the present invention.

An embodiment of the present invention will now be described in detail with reference to the accompanying drawings. Note that the same reference numerals denote the same parts throughout the drawings for explaining the embodiment, and a repetitive description thereof will be omitted. On the other hand, a part explained using a reference numeral in a drawing will sometimes be mentioned with the same reference numeral in an explanation of another drawing, although not illustrated again.

<Outline>

As described above, in a case where the same destination proposal type sales method as the conventional technique described in patent literature 1 is applied to sales of a train ticket of a Shinkansen train, a limited express train, or the like, in a railway, even if the system designates the destination station, the user can make a stopover, and it is therefore impossible to preclude the possibility of the user making a stopover and going to another unintended station.

In this case, for example, in JR East (registered trademark, and the same will apply hereinafter), the Tohoku Shinkansen and the Yamagata Shinkansen starting from Tokyo Station take different routes, but these overlap before branching at Fukushima Station. That is, even different routes partially overlap in some cases. In this case, even if the system extracts a plurality of different destinations (stations) as candidates, partial sections of the routes to the destinations may overlap in all the routes. Hence, regardless of the destination decided by the system by lottery, the user can make a stopover at a station included in the overlap portion, thereby definitely going to the concerned station.

Hence, for example, the user may use the service to go to the concerned station using a cheap train ticket, and the purpose of the destination proposal type sales method, that is, providing, to the user, a trip in which they can experience unexpectedness and expectation because the destination is unknown until just before the departure, may be lost.

A vehicle use ticket assignment system according to the embodiment of the present invention extracts, by a configuration and method to be described below, destination candidates such that these do not include a midway stop station to which a user can definitely go by making a stopover, when implementing a mechanism for assigning a use ticket such as a train ticket by sales or the like using a destination proposal type method in a moving means (vehicle) such as a railway that allows the user to make a stopover.

Note that in the embodiment of the present invention below, a case where the moving means (vehicle) is a railway like a Shinkansen train or a limited express train, and a train ticket is sold will be described as an example. However, it is not limited to a railway if the moving means (vehicle) has a fixed route and includes a fixed point (a station or a stop) that allows the user to get on/off on the route, and a route bus or a water transport can also be included (on the other hand, a moving means that has no fixed route, like a taxi, and a moving means that has a fixed route but allows the user to freely get on/off at any point on the way, like a hail-and-ride bus, are excluded).

That is, the concept "use" in the vehicle use ticket assignment system according to the present invention includes not only getting on a vehicle such as a train or a bus but also getting on a ship. Also, the concept "use ticket" includes not only a ticket representing a right to get on a target vehicle and move but also, for example, a ticket representing an additional condition, for example, an express ticket or a ticket for reserving a seat or enabling use of an upgrade seat. Not only a physical ticket but also, for example, a ticket represented by data of an application on a smartphone is included. Also, the concept "assignment" includes not only sales but also reservation in the preceding stage.

<System Configuration>

FIG. 1 is a block diagram showing the outline of a configuration example of a vehicle use ticket assignment system according to an embodiment of the present invention. A vehicle use ticket assignment system 1 according to this embodiment is an information processing system configured to implement a destination proposal type sales method in which for a customer (user) who "wants to go somewhere", the system automatically decides, by lottery, a final destination and trains (Shinkansen trains or limited express trains) from a plurality of destination candidates extracted based on input conditions. This makes it possible to preferentially select trains of the seller's desire (for example, candidate sites of which much stock (vacant seats) is expected to remain) and promote sales of stock. On the other hand, in this embodiment, the automatically decided destination is kept secret from the user until just before the departure, thereby providing, to the user, an experience of unexpectedness and expectation for the trip.

The vehicle use ticket assignment system 1 according to this embodiment includes, for example, a vehicle use ticket assignment server 10 that is a server system implemented by a server apparatus or a virtual server constructed on a cloud computing service, and a railway company system 20 operated by a railway company or the like to manage the vacant seat condition (stock) of each train and process a seat reservation by a customer, and these can communicate via a network such as a LAN (Local Area Network) (not shown). As shown in FIG. 1, this embodiment assumes the existing railway company system 20 held by a railway company or the like, and the vehicle use ticket assignment server 10 that cooperates with that is separately provided. However, these may be formed as an integral information processing system, as a matter of course.

Also, a user terminal 40 formed by an information processing terminal such as a PC (Personal Computer), a tablet terminal, or a smartphone held by the user can be connected to the vehicle use ticket assignment server 10 and the railway company system 20 via a network 30 such as the Internet.

The railway company system 20 is an existing information processing system held by a railway company or the like, and has at least a function of accepting a seat reservation for each train operated by the railway company of interest and holding and managing it. In this embodiment, the railway company system 20 includes, for example, a reservation processing unit 21 implemented as software operating on middleware such as an OS (Operating System), a DBMS (DataBase Management System), or a web server program (none are shown). The railway company system 20 also includes data stores such as a stock database (DB) 22 and a purchase history DB 23, each of which is implemented by a database or the like.

The reservation processing unit 21 includes an interface configured to accept a seat reservation, and if a reservation is established, updates, based on the contents of the reservation, the contents of the stock DB 22 that manages vacant seat (stock) information and the purchase history DB 23 that records the purchase history (boarding history) of each customer. The interface provided in the reservation processing unit 21 may be, for example, a user interface that accepts a reservation input from the user terminal 40 or the like via the network 30, or may be a programming interface or data linkage interface that accepts an instruction from the vehicle use ticket assignment server 10 to be described later.

The vehicle use ticket assignment server 10 is a server system having a function of accepting an input of conditions from the user, extracting destination candidates and deciding a final destination and trains from the candidates by lottery, and includes, for example, units such as a stock management unit 11, a destination candidate extraction unit 12, and an application management unit 13, each of which is implemented as software operating on middleware such as an OS, a DBMS, or a web server program (none are shown). The vehicle use ticket assignment server 10 also includes data stores such as a stock DB 14, a purchase history DB 15, a user DB 16, and an application DB 17, each of which is implemented by a database, a file table, or the like.

In a case where the vehicle use ticket assignment server 10 is configured as one or more server devices, a processor of the vehicle use ticket assignment server 10 executes a computer program stored in a memory to realize each operation of the stock management unit 11, the destination candidate extraction unit 12, and the application management unit 13. Also, in a case where the vehicle use ticket assignment server 10 is implemented by a virtual server or the like constructed on a server device or a cloud computing service, the vehicle use ticket assignment server 10 executes a computer program stored in a memory by a processor of the server device or a computer that implements the cloud computing services to realize each operation of the stock management unit 11, the destination candidate extraction unit 12, and the application management unit 13. In other words, in the explanation below, where the vehicle use ticket assignment server 10, the stock management unit 11, the destination candidate extraction unit 12, and the application management unit 13 are explained as the operation agent of the processing, the processing is actually realized by a processor executing a computer program stored in a memory.

For example, in a case where the vehicle use ticket assignment server 10 causes the various screens described later (for example, the condition setting screen) to be displayed on the user terminal 40, the vehicle use ticket assignment server 10 generates information to be displayed in the screen and transmits it to the user terminal 40. At that time, the information to be displayed in the screen is generated by the processor executing a computer program. The user terminal 40 receives information for display from the vehicle use ticket assignment server 10 and displays the screen on a display unit using a browser application or a dedicated application, for example.

The stock management unit 11 has a function of holding, in the stock DB 14, information concerning vacant seats (stock) of trains of a sales target and managing it. Note that unlike an airplane in which all seats are basically reserved seats, non-reserved seats exist in the railway, and not all the seats are managed in the viewpoint of vacant seat (stock). In this embodiment, even a train in which non-reserved seats can be used is handled as "stock" in a sense of "train that can be sold".

In this embodiment, the stock management unit 11 extracts stock information periodically or at any time from the stock DB 22 that holds the latest stock information in the railway company system 20, and constructs the stock DB 14 by copy or replication. The vehicle use ticket assignment server 10 may not include the stock DB 14, and the stock DB 22 on the railway company system 20 may directly be referred to. In addition to the stock information, information of the train ticket purchase history (boarding history) for each user may be extracted from the purchase history DB 23 on the railway company system 20 and copied or replicated, thereby constructing the purchase history DB 15 on the vehicle use ticket assignment server 10.

The destination candidate extraction unit 12 has a function of accepting an input of conditions from the user via the user terminal 40, extracting a plurality of destination candidates based on the stock information in the stock DB 14, the past purchase (boarding) history information in the purchase history DB 15, and user attribute information registered in the user DB 16, deciding a final destination and trains from the candidates, and presenting these to the user terminal 40. Note that details of processing contents concerning extraction of the destination candidates and decision of the final destination will be described later.

The application management unit 13 has a function of accepting an input of a train ticket purchase application from the user via the user terminal 40 and registering it in the application DB 17. As will be described later, at the point of time of accepting the application, only destination candidates are presented to the user, and the contents of the application include the contents of the candidates. For example, after an application is accepted, the application management unit 13 notifies the user of a final destination and outward/return trains at a predetermined timing until the day of departure on the outward trip. At the point of time of deciding the final destination, the reservation may automatically be established based on the contents via the reservation processing unit 21 of the railway company system 20. Alternatively, the user may manually establish the reservation by accessing the reservation processing unit 21 via the user terminal 40.

<Examples of Screen Transition>

Figures 2, 3:
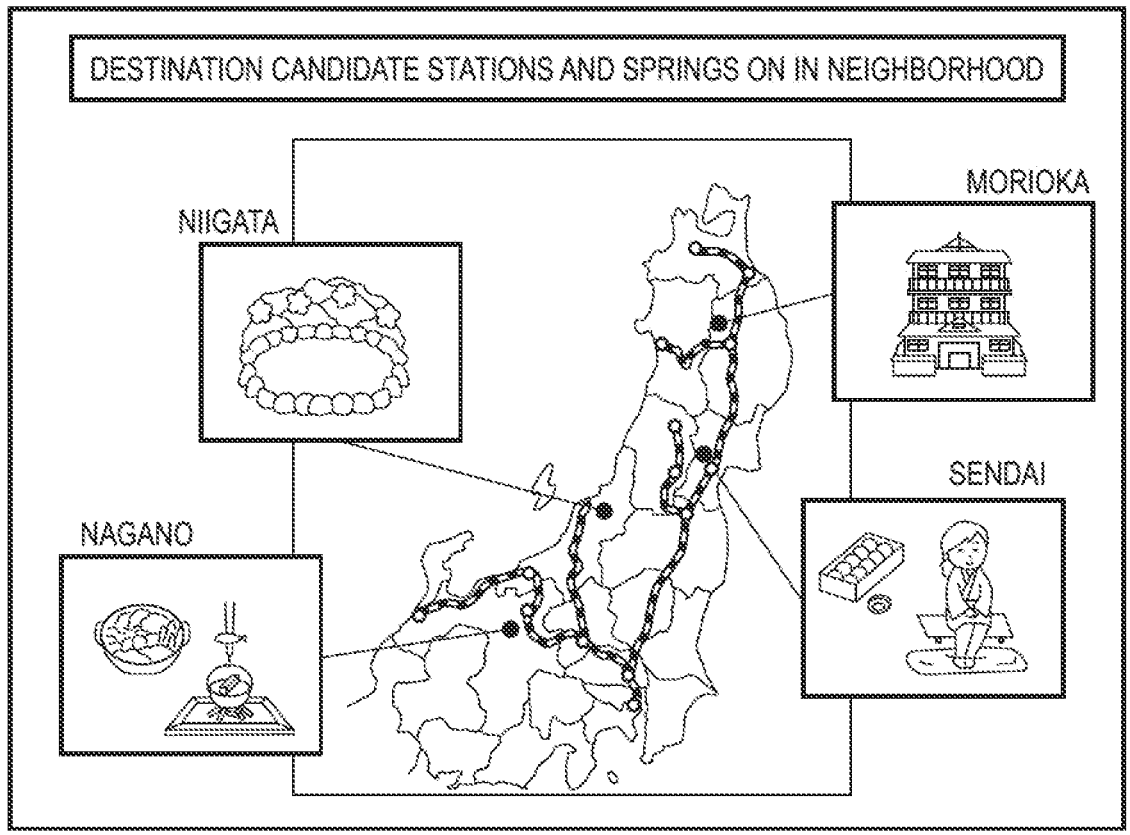
FIG. 2 is a view showing the outline of an example of a screen displayed on a user terminal by a train ticket sales server according to the embodiment of the present invention.
FIG. 3 is a view showing the outline of an example of a screen displayed on the user terminal by the train ticket sales server according to the embodiment of the present invention.

FIGS. 2 to 5 are views showing the outline of examples of screens displayed on the user terminal 40 by the vehicle use ticket assignment server 10 according to this embodiment. If the user accesses the vehicle use ticket assignment server 10 using a web browser or a dedicated application (neither are shown) on the user terminal 40, a condition input screen as shown in FIG. 2 is displayed. Here, a desired date is input for each of the outward trip and the return trip, and the departure time of the outward trip and the arrival time of the return trip are each designated as a time slot.

If the departure time of the outward trip and the arrival time of the return trip cannot be designated at all, it is difficult for the user to user the system because the range of trains selected by the system becomes too wide, and he/she cannot know when to depart and when to return. On the other hand, if the departure time of the outward trip and the arrival time of the return trip can finely be designated, the choices of trains selected by the system becomes too narrow, and it is difficult to select an unexpected destination as the destination proposal type sales method. Hence, in this embodiment, for example, for the departure time and the arrival time, time slots are divided into "early morning" from 5:00 to 9:00, "morning" from 9:00 to 12:00, "afternoon" from 12:00 to 17:00, "evening" from 17:00 to 20:00, "midnight" from 20:00 to 24:00, and the like, and designated.

Note that in this embodiment, considering that the required time changes depending on the destination, for the return trip, the time slot of the arrival time is designated to as an indicator representing when the user can return to the departure point. However, the present invention is not limited to this, and to enable selection focusing on the stayable time at the destination, the time slot of the departure time may be designated even for the return trip.

In the screen shown in FIG. 2, the boarding station at the departure point is designated, and the number of boarding persons is input. The destination station cannot be designated, as a matter of course. Although not taken into consideration in this embodiment, the purpose of the trip (for example, a springs trip or a golf trip) may be designated here.

If the user designates/inputs the conditions and presses a "search" button, a plurality of candidate sites (candidate stations) extracted by the destination candidate extraction unit 12 of the vehicle use ticket assignment server 10 using a method to be described later are displayed by a screen shown in FIG. 3. Note that in this embodiment, four candidate sites are extracted and displayed. However, the number of candidate sites to be displayed is not limited to this.

Here, for example, if the user registers preferences, wishes, and hobbies associated with trips as attribute information in the user DB 16 of the vehicle use ticket assignment server 10 in advance, the display contents may be personalized in accordance with the contents.

At this point of time, the final destination is not finalized for the user. If the user agrees to go to one of the candidate sites displayed on the screen shown in FIG. 3, a screen to do application and settlement processing as shown in FIG. 4 is displayed. If the settlement is completed here, the user can ensure only the right to go to one of the four candidate sites, although the final destination is not finalized. Note that the example of FIG. 4 shows a case where the user uses the points of a point service as a settlement method. However, the settlement method is not particularly limited, and another settlement method such as credit card settlement can be used, as needed.

After the application and settlement, by the screen as shown in FIG. 5, the user is notified, at a predetermined timing until the departure date of the outward trip, that the final destination is decided. The example of FIG. 5 shows that the final destination is decided to Morioka Station. The notification is made, for example, via a dedicated application installed in a smartphone held by the target user or by transmitting email including a hyperlink for displaying the screen shown in FIG. 5 to the target user. In this embodiment, this notification is made, for example, four days before the departure date of the outward trip. That is, the final destination remains not finalized until four days before the departure date.

Thus, after the application via the screen shown in FIG. 4, the decision of the final destination and the notification to the user by the screen shown in FIG. 5 are performed just before the departure of the outward trip. This makes it possible to decide the optimum destination (with the largest number of stock seats) in accordance with the number of stock seats (vacant seat condition) just before the departure and cope with the variation of the number of stock seats until just before the departure, a sudden sold-out state, and the like. On the other hand, from the viewpoint of the railway company that is the seller, sales of stock are not finalized until just before the departure, and stock management until then is difficult.

As a measure against this, if the application via the screen shown in FIG. 4 is accepted, the final destination may be decided, and the reservation may be registered via the railway company system 20 at that point of time to reflect the processing on the stock DB 22. In this case, since the processing is reflected on the stock DB 22 at the time of application, stock management after that can be performed clearly and easily. On the other hand, as the destination proposal type sales method for the user who "wants to go somewhere", the experience of unexpectedness and expectation for the user when "the destination is unknown until just before the departure" may decrease.

In this embodiment, the method to be used is not limited. As for the final destination, an optimum destination may be selected just before the departure in accordance with the number of stock seats at that time. Alternatively, at the time of acceptance of the application via the screen shown in FIG. 4, the final destination may be decided, and the reservation may also be registered. However, without making the notification, the final destination may be kept secret from the user until just before the departure, as in the above-described example. This can make stock management clear and easy, as needed, and realize an enhancement of the experience unexpectedness and expectation for the user. That is, the timing of final destination decision and actual reservation registration or the timing of notification to the user can appropriately be set depending on which element of optimum stock sales, stock management, and appeal to the user should be focused.

<Consideration in Railway>

When extracting/deciding destination candidates to be presented on the screen shown in FIG. 3, as described above, if the moving means is a flight, once the airplane departs, no one can get off until arrival. Hence, once the airport of the destination is specified, there is no room for the user to fly to an airport other than the concerned destination. Hence, if a plurality of different airports are extracted as destination candidates, the user necessarily flies to a different destination depending on which one of the destinations is selected by lottery.

On the other hand, if the moving means is a railway, even if the vehicle use ticket assignment system 1 designates the destination station, the user can make a stopover, and it is therefore impossible to preclude the possibility of the user making a stopover and going to another unintended station.

FIGS. 6A and 6B are views showing the outline of an example of decision of a destination according to the embodiment of the present invention. FIG. 6A shows, defining an A station as a departure station (■), four trains (train 1 to train 4) used to go to stations (●) associated with four decided destination candidates, and stop stations (○) and nonstop stations (→) of the trains. Here, all of train 1 to train 4 commonly stop at a C station and a E station (×). In this case, regardless of a station selected from the four candidate stations by the vehicle use ticket assignment system 1, the user can definitely go to the C station or the E station by making a stopover at the station.

That is, at the timing of presenting the four destination candidates, the user can definitely know that he/she can go to the C station or the E station at the stage before the application of purchase of the train ticket, far from determining the final destination. This can be a method (loophole) to inexpensively go to these stations. As a result, the purpose of the destination proposal type sales method, that is, providing, to the user, a trip in which they can experience unexpectedness and expectation because the destination is unknown until just before the departure with a cheap train ticket, is lost, and the experience of the service is destroyed.

Note that although all trains stop at an X station as well in the example of FIG. 6A, this exerts no influence because the destinations of train 3 and train 4 are a W station and a V station before the X station. In addition, the trains commonly stop at the C station and the E station. However, for a station close to the departure station, and the train ticket is already cheap, like, for example, Ueno Station or Omiya Station in the Tohoku/Joetsu/Hokuriku/Yamagata/Akita Shinkansen starting from Tokyo Station, the purpose of the sales method of the destination proposal type service is not met, and there is no economic reason to purchase the train ticket using this service. Hence, it can be said that there is no problem.

To avoid occurrence of a station, like the C station and the E station in FIG. 6A at which all trains commonly stop, in this embodiment, if there is such a midway stop station, for example, as shown in FIG. 6B, one (train 4 in the example) of the four trains is replaced with another train (train 5 in the example) that does not stop at the common midway stop stations (the C station and the E station in the example). This can avoid occurrence of a midway stop station to which the user can definitely go when the four destinations are decided. The method of avoiding occurrence of a definite midway stop station will be described later.

<Procedure of Processing>

Figure 7:
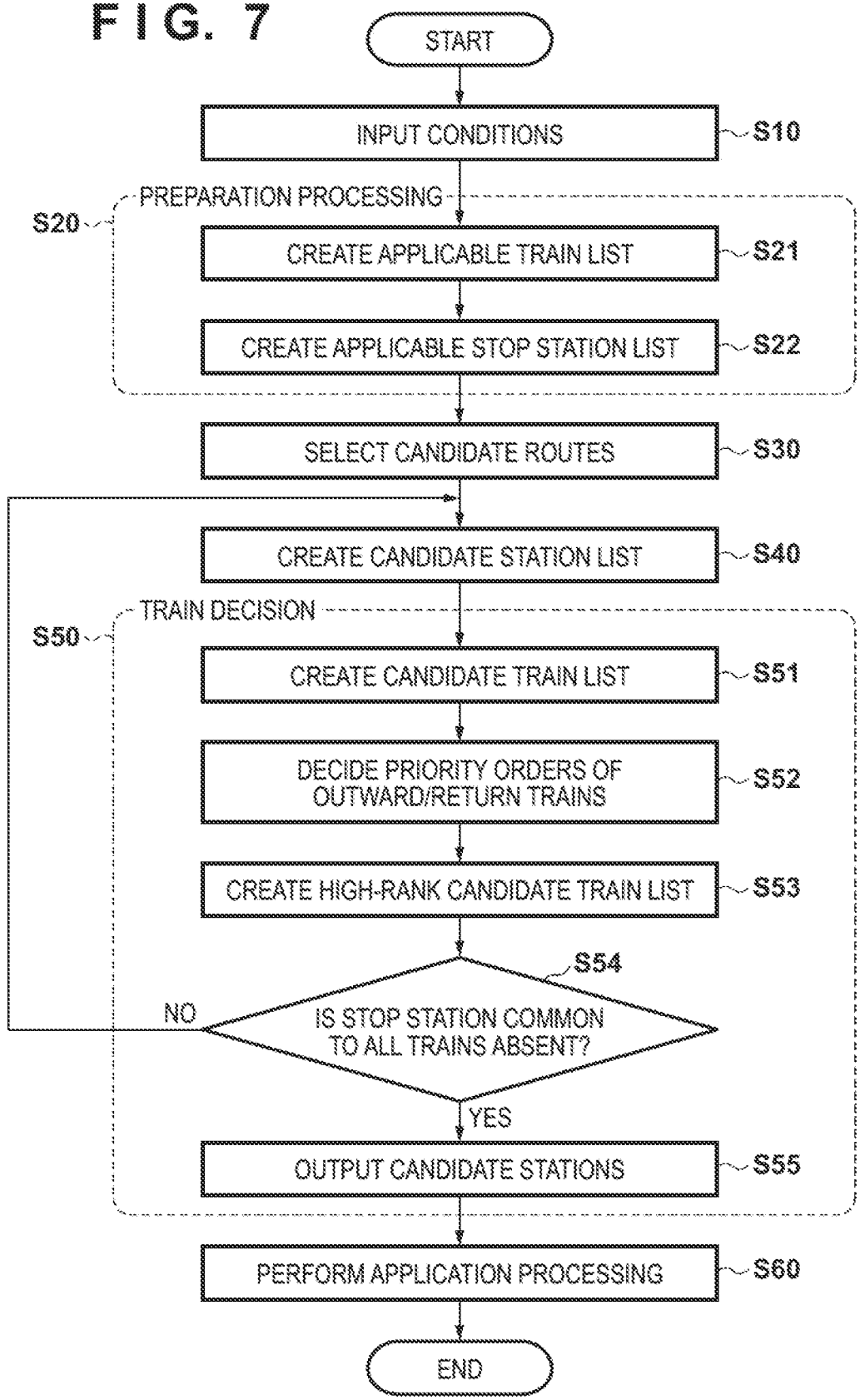
FIG. 7 is a flowchart showing the outline of an example of the procedure of train ticket sales processing according to the embodiment of the present invention.

FIG. 7 is a flowchart showing the outline of an example of the procedure of train ticket sales processing according to the embodiment of the present invention. Where not mentioned specifically, the present process is realized by the destination candidate extraction unit 12 of the vehicle use ticket assignment server 10 operating as the agent of the processing.

First, the vehicle use ticket assignment server 10 accepts an input of conditions associated with train ticket sales from the user via the screen as shown in FIG. 2 described above (step S10).

Upon accepting the input of conditions, as preparation processing (step S20), the destination candidate extraction unit 12 of the vehicle use ticket assignment server 10 first extracts trains that match the conditions input in step S10 from the stock DB 14, thereby creating an applicable train list (step S21). More specifically, trains which correspond to the date and time slot of each of the outward trip and the return trip designated in the input conditions and whose numbers of stock seats are larger than the designated number of persons are extracted from the stock registered in the stock DB 14, thereby creating an applicable train list. Note that the list of all numbers of stock seats of all trains is reflected/registered in the stock DB 14 in advance by the stock management unit 11. The number of stock seats here is obtained by subtracting, for each train, the number of sold seats from the number of sellable seats from the departure station designated by the user. Even a single train sometimes has different numbers of stock seats depending on the destination station. In that case, for example, the smallest number of stock seats may be applied, or the number of stock seats may be held for each station.

FIGS. 8A and 8B are views showing the outline of detailed examples of applicable train lists according to the embodiment of the present invention. FIGS. 8A and 8B show examples of applicable train lists of the outward trip and the return trip, which match the conditions designated in the condition input screen shown in FIG. 2. In FIG. 8A, trains which depart from Tokyo Station early morning on September 28 and for which the number of stock seats is 4 or more are listed. In FIG. 8B, trains which arrive at Tokyo Station in the evening on September 29 and for which the number of stock seats is 4 or more are listed. Note that as an additional condition other than the conditions designated by the user, for example, according to the vehicle type or the number of seats of each train, a train whose number of stock seats is a predetermined number or less may be handled as unsellable (or excluded from the list). The examples of FIGS. 8A and 8B show that hatched trains are handled as unsellable because these match the additional condition.

Referring back to FIG. 7, next, based on the applicable train list created in step S21, an applicable stop station list formed by the stop stations of the trains included in the list is created (step S22). More specifically, a list of stop stations is extracted from the applicable train list of the outward trip, and a list of stop stations is extracted from the applicable train list of the return trip. Then, the applicable stop station list is formed by stop stations commonly included in both the list of stop stations of the outward trip and the list of stop stations of the return trip. Note that close stop stations that exist within a predetermined range (distance, time, or number of stations) from the departure station (of the outward trip) may be excluded from the list because these do not meet the purpose of train ticket sales of destination proposal type.

Accordingly, the destination candidate extraction unit 12, by excluding a stop station that exists within a predetermined range from the departure station (that is, a station at which a stopover is permitted in regards to the train ticket sale) from the applicable stop station list, can reduce the size of the applicable stop station list, and reduce processing cost for score calculation for the respective stop stations and the like described later in FIG. 11. For example, the destination candidate extraction unit 12 reads from memory a table that defines for each departure station the stations for which a stopover is permitted that exist within a predetermined range from the departure station, and excludes stations for which a stopover is permitted from the applicable stop station list. By doing this, the destination candidate extraction unit 12 can reduce the processing cost for extracting a destination candidate. Alternatively, it is possible for information of the distance between the stations to be included in the list of stop stations, and based on the distance information between the stations, specify a stop station that exists within a predetermined range from the departure station on the outward trip. For example, assuming the distance between the n-th station from the departure station (n=0) to the n-lth station is Dn, Ds=D1+D2+D3+ . . . is added up in order from the nearest stop station to the departure station. In a case where the summation result Ds exceeds a threshold value Dth of the distance corresponding to the predetermined range (Ds>Dth), it is possible to determine that the last stop station for which the adding up was performed is outside of the predetermined range. In such a case, the stations before the stop station for which the distance between stations was last added are specified as stop stations that exist within the predetermined range from the departure station. In the description above, information on the distance between stations is recorded, but this may be replaced with a traveling time Tn required for the vehicle to travel between the stations. In such a case, the distance threshold Dth is replaced with a corresponding amount of time threshold Tth, and at a point in time when the total Ts of the traveling time Tn exceeds the amount of time threshold Tth similarly to what is described above, it is possible to determine the corresponding stop station to be outside of the predetermined range. Accordingly, the destination candidate extraction unit 12 can improve the processing speed, and improve the response speed for displaying the screen (FIG. 3) shown in the destination candidates.

In this embodiment, the processing procedure of individually extracting the stop station lists of the outward trip and the return trip and extracting stop stations common to both lists, as described above, is used. However, the processing procedure is not particularly limited if it can obtain the same effect as described above. For example, as processing corresponding to steps S21 and S22, a processing procedure of creating the applicable train list and extracting the list of stop stations first only for the outward trip, after that, for the return trip, creating the applicable train list using only trains whose stop stations are included in the stop station list of the outward trip and creating the applicable stop station list using stop stations included in the applicable train list of the return trip may be used.

Note that in this embodiment, since four candidate sites (stations) are presented as destination candidates, as shown in FIG. 3, if the number of stop stations included in the applicable stop station list created in step S22 is 3 or less, the mechanism for selecting the destination from the plurality of candidate sites by lottery may not hold. Hence, in step S22, it is checked whether the number of stop stations included in the created applicable stop station list is 3 or less. If the number is 3 or less, for example, a message such as "no applicable train is available" may be displayed on the user terminal 40, and the processing may be ended.

FIG. 9 is a view showing the outline of examples of applicable stop station lists according to the embodiment of the present invention. The table on the upper stage of FIG. 9 shows stop stations (○) and nonstop stations (→) of applicable trains (train 1 to train 3) of the outward trip, and the table on the lower stage shows stop stations (○) and nonstop stations (←) of applicable trains (train a to train c) of the return trip. A list of stop stations capable of forming a combination of outward/return trains while setting a station at which at least one train stops on each of the outward trip and the return trip (in the example shown in FIG. 9, the A station, the C station, the E station, the V station, the W station, the X station, and the Z station), that is, the concerned station as the destination is the applicable stop station list.

At this time, as described above, a close stop station within a predetermined range from the departure station (of the outward trip) may be excluded from the list because that does not meet the purpose of train ticket sales of destination proposal type. Reversely, for a far stop station outside the predetermined range, the outward/return boarding time is long, and the stay time at the destination decreases accordingly. Hence, for example, the shortest stay time at the destination may be set in advance for each number of stay days of the condition designated by the user and stored in memory. If a combination of outward/return trains capable of satisfying the condition does not exist, the concerned station may be excluded from the list.

Accordingly, the destination candidate extraction unit 12, by excluding from the applicable stop station list stations that do not satisfy the shortest stay time at the destination, can reduce the size of the applicable stop station list and reduce processing cost for the score calculation for the respective stop stations which will be described later using FIG. 11. For example, the destination candidate extraction unit 12 calculates the stay time from the time of arrival at a stop station on an outward trip specified based on the boarding time and the departure time from the stop station on the return trip. Then, in a case where the stay time is shorter than the shortest stay time read from the memory, the stop station is excluded from the applicable stop station list. In other words, the destination candidate extraction unit 12 can reduce the processing cost for extracting destination candidates. Accordingly, the destination candidate extraction unit 12 can improve the processing speed, and improve the response speed for displaying the screen (FIG. 3) showing the destination candidates.

Referring back to FIG. 7, if the preparation processing in step S20 is ended, four routes (directions or station series) are selected at random from routes concerning the stop stations included in the applicable stop station list to set candidate routes (step S30). At this time, for example, in a case where a route branches from the departure station to a plurality of routes, if four routes are selected at random, all the four selected routes may concentrate to one branch. In this case, the possibility that a midway stop station common to all trains, like the C station and the E station in the example of FIG. 6A, will occur becomes high.

Figures 10, 11:
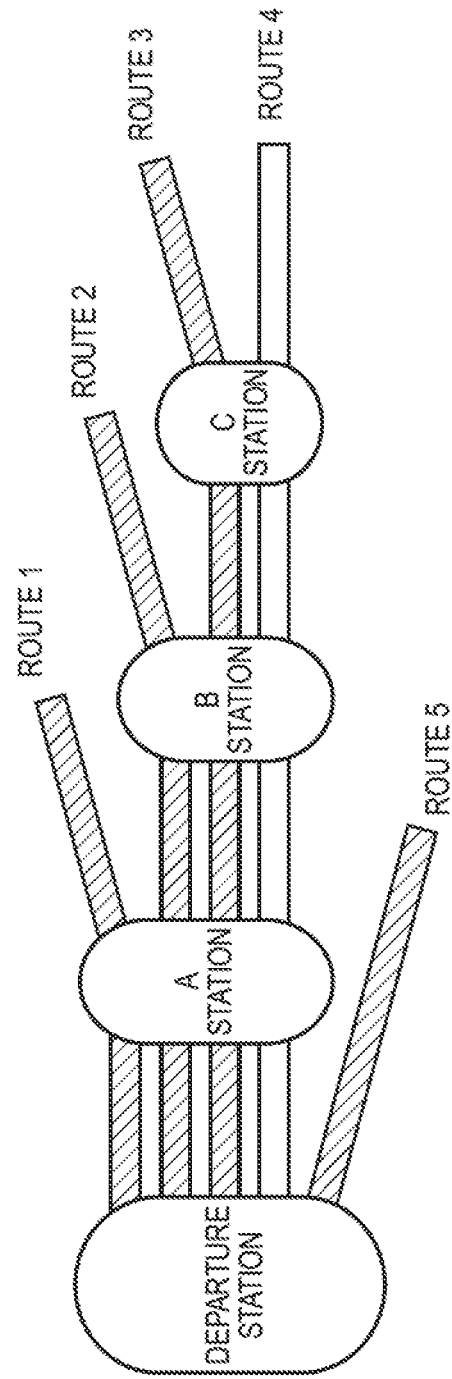
FIG. 10 is a view showing the outline of an example in which routes (directions) are adjusted according to the embodiment of the present invention.
FIG. 11 is a view showing the outline of an example in which a candidate station list is created according to the embodiment of the present invention.

FIG. 10 is a view showing the outline of an example in which routes (directions) are adjusted according to the embodiment of the present invention. In the routes of the configuration as shown in FIG. 10, if route 1, route 2, route 3, and route 4 are selected as four routes, the A station is a midway stop station common to the routes, and it is definitely known that the user can go to the A station regardless of the finally decided destination. Hence, in this embodiment, at least one route is set in a direction different from the directions of the remaining routes, thereby avoiding concentration of all routes to one branch. The example shown in FIG. 10 shows that route 5 that does not pass through the A station is selected in place of route 4.

More specifically, in the Shinkansen departing from Tokyo Station or Ueno Station of JR East, if four routes are selected such that these are not biased to one of the Utsunomiya direction (Tohoku (Hokkaido) Shinkansen, Akita Shinkansen, and Yamagata Shinkansen) from Omiya Station and the Takasaki direction (Joetsu Shinkansen and Hokuriku Shinkansen), a midway stop station common to all routes can be eliminated (since Omiya Station is close to Tokyo Station or Ueno Station, there is no economic rationality in purchasing the train ticket using this system and making a stopover, and there is no influence). Note that the present invention is not limited to the case where the starting station of each route, like Tokyo Station in the Shinkansen, is set to the departure station, and bias of branch of the routes from there is adjusted. Similarly, For example, if Nagoya Station in the Tokaido/Sanyo Shinkansen of JR Central (registered trademark, and the same will apply hereinafter) is set to the departure station, the inbound and outbound lines to Tokyo and Shin-Osaka are identical routes but are regarded as different branches, and the routes are adjusted such that these are not biased to one of them.

In the route bias adjustment as described above, if the configuration of routes is known, the routes may be selected while adjusting the bias, instead of selecting four routes at random at the time of first selection. Alternatively, bias is checked after four routes are selected at random, and if the routes are concentrated to one branch, one of the routes may be changed to another route (direction).

For example, the destination candidate extraction unit 12 reads branch data indicating a stop station that is a branch for each route from memory, and identifies the stop stations that are branches in the selected four respective routes. The destination candidate extraction unit 12 compares the identified stop stations and determines that branches are biased in a case where the identified stop stations overlap in a predetermined number of routes among the four routes. In the case where the predetermined number is set to four, the destination candidate extraction unit 12 determines that the branches are biased in the case where four routes are biased to one branch, for example. The destination candidate extraction unit 12, in a case where it determines that the branches are biased for the selected four routes, changes one of the routes selected randomly to another route (direction), for example.

Note that, for example, in a case where the departure station is a starting station, and the route is a single track, like the Tokaido/Sanyo Shinkansen using Tokyo Station as the starting station, depending on the configuration of routes, it may be impossible to perform adjustment by changing a route to another route, as described above, such that the routes are not concentrate to one branch. In this case, adjustment is performed by a method to be described later such that a definite midway stop station does not occur on a train basis on the outward trip and the return trip.

Referring back to FIG. 7, next, in each of the four candidate routes selected in step S30, one station to be presented to the user as a candidate site is selected from the stop stations included in the applicable stop station list created in step S22, thereby creating a candidate station list (step S40). More specifically, for example, in each of the four candidate routes, one station is selected from, of the stop stations, the stop stations included in the applicable stop station list by random lottery based on a lottery probability set in accordance with a score set in advance for each station.

As for the score, for example, for each station, a weight is set for each predetermined parameter to add the weight, and the weights are multiplied to calculate a score. The parameter serving as the base is the number of stock seats on the outward trip and the return trip between the departure station and each station. The weight is set such that the larger the number of stock seats is in a station, the higher the score is. A weight by another parameter can be reflected on this. For example, as the parameter for each station, a weight can be set depending on whether the station is popular (a station where the number of users or the number of trains is large), or whether the station is a target of a campaign of a railway company or the like. The weight may be set to zero to inhibit a concerned station from being selected as a candidate station.

Even in the same station, the weight may be changed by month, day of week, time slot, or a combination thereof. For example, even for trains that depart from the same station, a circumstance that, for example, the demand for a train in Friday evening is high, and the stock is readily sold, as compared to trains in another time slot on weekdays, can be reflected. Furthermore, as an individual-specific weight for each user, for example, a weight may be set such that a destination drawn by lottery/decided in the past using this service or the same station as the destination that the user visited in the past is hardly selected again. Note that setting information concerning what value is to be taken by the weight if each parameter falls under what condition may be registered in advance in a setting file or a table (neither are shown) outside and changed as needed.

FIG. 11 is a view showing the outline of an example in which a candidate station list is created according to the embodiment of the present invention. Here, for the stop stations included in the applicable stop station list of a certain route as shown in the example of FIG. 9, weights are set for station-, month-, day-of-week-, and individual-specific parameters as described above, and the result of multiplication of the weights is shown on the lowermost stage. A lottery is performed based on a lottery probability set in accordance with the magnitude of each value, thereby selecting candidate stations in the concerned route. In the example shown in FIG. 11, the lottery probability of the W station is set highest.

As described above, in this embodiment, when selecting four candidate stations of destinations, four candidate routes are selected by lottery, and a candidate station is selected by lottery from the applicable stop stations of each candidate route. At this time, since the lottery probability is set based on the weight of each parameter, if a search is performed a plurality of times for the same user at close time intervals, a case where a specific station is readily selected as a candidate station may occur unless the number of stock seats largely changes. However, the contents of candidate stations presented every time the search is performed can change. At this time, if the user is permitted to repeat the search many times until a good combination of candidate stations appears, an excessive load is applied to the system.

Accordingly, in this embodiment, by recording details of a condition that a user inputted, an identifier of a user, and candidate stations of a search result in a Cookie, in a case where the same condition is inputted again by the same user, candidate stations with the same details as the candidate stations outputted the first time are output as long as there is stock. If the candidate stations of the first search result cannot be selected because, for example, there is an insufficient stock of seats because of a variation of stock, a response "no station is available" is returned. This can suppress a repetitive search by the user. For example, a limit may be set for the number of times search processing is performed, and the user may be permitted to do the search processing only a predetermined number of times, instead of always using the first search result in the case where the same conditions are designated. Also, after the elapse of a predetermined period, for example, after several days, the processing may be reset, and a new search may be performed again.

Referring back to FIG. 7, if the four candidate stations are decided, next, a series of processes for deciding trains to be actually sold to the user in the combination of outward/return trains between the departure station and each candidate station, and the destination station is performed (step S50). Here, a weight according to the number of stock seats is set to perform scoring of each train, and final outward/return trains are decided by lottery based on the lottery probability according to the score.

Note that in this embodiment, as described above, the decision of the final destination and outward/return trains and the setting of the timing of registration of an actual reservation can flexibly be performed. For this reason, depending on the setting, the stock of a target train may already be absent at the time of registration of the actual reservation in the railway company system 20, and tickets may be unsellable.

Hence, in this embodiment, to avoid the above-described risk, when deciding final outward/return trains by lottery, the order of outward/return trains other than one decided outward/return train may be decided in advance by lottery to form a list of priority orders. Even if the stock of the target train is absent at the time of registration of the reservation, the candidate train of the next order can quickly be set to the target, and the reservation can be registered. If there is no stock even for the candidate train of the next order, the candidate train of the next order is set to the target. In this way, the reservation can be attempted by sequentially extracting an alternate candidate train from the list of priority orders until the reservation can be registered.

For example, the destination candidate extraction unit 12 sets a priority order list in accordance with a score based on a weight according to the number of stock seats calculated in step S50. Accordingly, it is possible to select a candidate train for which it is highly likely that stock exists. Accordingly, it is possible to suppress processing costs of repeatedly attempting a reservation.

Also, in this embodiment, even if the reservation is registered, the information of the final destination and the outward/return trains may not be notified to the user until just before the departure, as described above. Hence, the outward/return train decision process as described above can also be kept secret from the user. Note that the priority orders may be decided for all candidate outward/return trains, or priority orders may be decided only for trains of a higher rank up to a predetermined order, and the processing may be omitted after that, thereby increasing the efficiency.

In the series of processes of step S50, first, a candidate train list formed by outward/return trains between the departure station designated in step S10 and the four candidate stations included in the candidate station list created in step S40 (step S51). More specifically, for each candidate station, a train that stops at the target candidate station is extracted from the applicable train list of the outward trip created in step S21, thereby creating the candidate train list of the outward trip. Similarly, a train that stops at the target candidate station is extracted from the applicable train list of the return trip created in step S21, thereby creating the candidate train list of the return trip. Based on the candidate train lists of the outward trip and the return trip, an outward/return candidate train list formed by all combinations of trains that can make a round trip to the candidate station is created.

FIGS. 12A and 12B and FIGS. 13A and 13B are views showing the outline of detailed examples of the candidate train list according to the embodiment of the present invention. FIGS. 12A and 12B show examples of the candidate train lists of the outward trip and the return trip, which are formed by extracting, concerning four candidate stations (Sendai Station, Morioka Station, Niigata Station, and Nagano station in the examples shown in FIGS. 12A and 12B) included in the candidate station list selected in step S40, trains that stop at the stations from the applicable train lists of the outward trip and the return trip shown in FIGS. 8A and 8B described above. Also, FIGS. 13A and 13B show an example of the outward/return candidate train list formed by combining all trains in the candidate train lists of the outward trip and the return trip shown in FIGS. 12A and 12B as trains that make a round trip to the candidate stations. FIGS. 13A and 13B show each candidate station surrounded by a thick frame for the sake of convenience.

Figure 14:
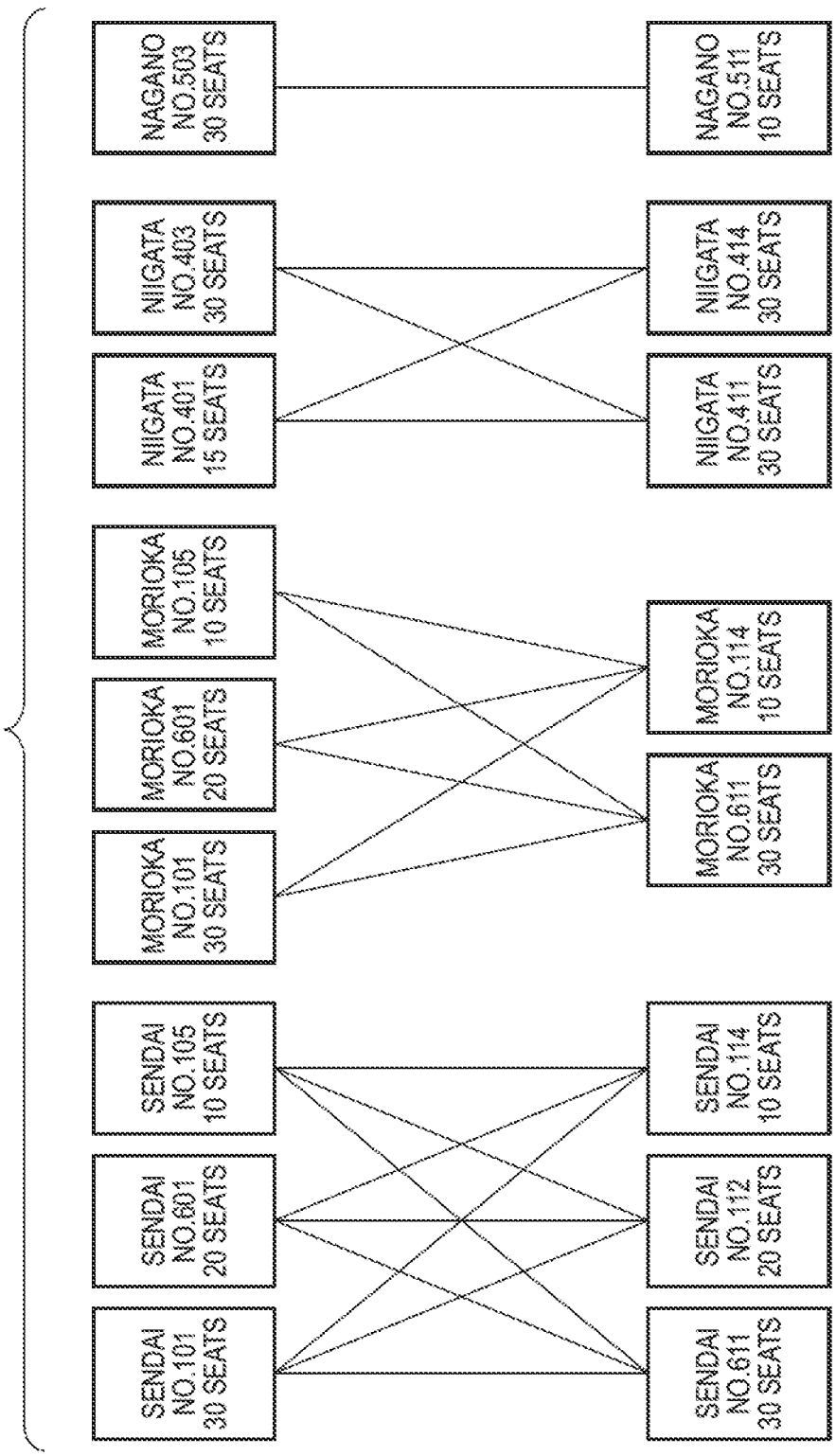
FIG. 14 is a view showing the outline of an example of the combination condition of trains on the outward trip and the return trip in an outward/return candidate train list according to the embodiment of the present invention.

FIG. 14 is a view showing the outline of an example of the combination condition of trains on the outward trip and the return trip in the outward/return candidate train list according to the embodiment of the present invention. Here, the combination condition in the outward/return candidate train list shown in FIGS. 13 A and 13B are shown. In FIG. 14, concerning the trains included in the candidate train list of the outward trip, candidate stations, train names, and numbers of stock seats are shown on the upper stage, and concerning the trains included in the candidate train list of the return trip, candidate stations, train names, and numbers of stock seats are shown on the lower stage. Also, as possible outward/return train combinations, trains for which the candidate station of the outward trip and the candidate station of the return trip are identical are combined by round robin and indicated by solid lines. That is, each solid line that connects trains on the outward trip and the return trip corresponds to each row of the outward/return candidate train list shown in FIGS. 13A and 13B.

Referring back to FIG. 7, next, for each combination of outward/return trains in the outward/return candidate train list created in step S51, processing of deciding the priority order based on a predetermined condition is performed (step S52). As the priority order decision method, various kinds of methods can be considered, and an arbitrary method can appropriately be employed.

For example, as the simplest method that can be considered in general, a method of, for the outward/return candidate train list shown in FIGS. 13A and 13B, sorting the combinations of outward/return trains at random and ranking them can be considered (this method is defined as the "0th method"). That is, one train is selected at random from the outward trains on the upper stage in the example shown in FIG. 14, and one train is selected at random from the return trains on the lower stage, which are combined with the selected outward train, thereby defining the outward/return trains of the first order. Processing of selecting the outward/return trains of the next order by performing the same processing as described above for the remaining combinations of outward/return trains is sequentially repeated until no combination of outward/return trains remains (the selection order of the outward trip and the return trip may be reversed).

If the 0th method as described above is employed, the logic used to create the list of the priority orders of the outward/return trains is simplified, and implementation is facilitated. On the other hand, in the viewpoint of sales of stock, the efficiency may lower. In the 0th method, whether the number of stock seats for each train is large or small is not taken into consideration at all. For this reason, even a route or a train with a small number of stock seats may be sold first. This cannot meet the requirement of the seller who wants to efficiently sell routes or trains with a large number of stock seats. Also, since even a route or a train having a small number of stock seats may be selected at random and sold, many trains that are unsellable (sold out) may appear, and this may disable to select four candidate stations of destinations.

On the other hand, to preferentially sell a train with a large number of stock seats, instead of ranking trains by random sorting, like the 0th method, it can be considered that a weight according to the number of stock seats is added to each train, such that the larger the number of stock seats of a train is, the more readily the train is selected/drawn by lottery (this method is defined as the "first method").

Figure 15:
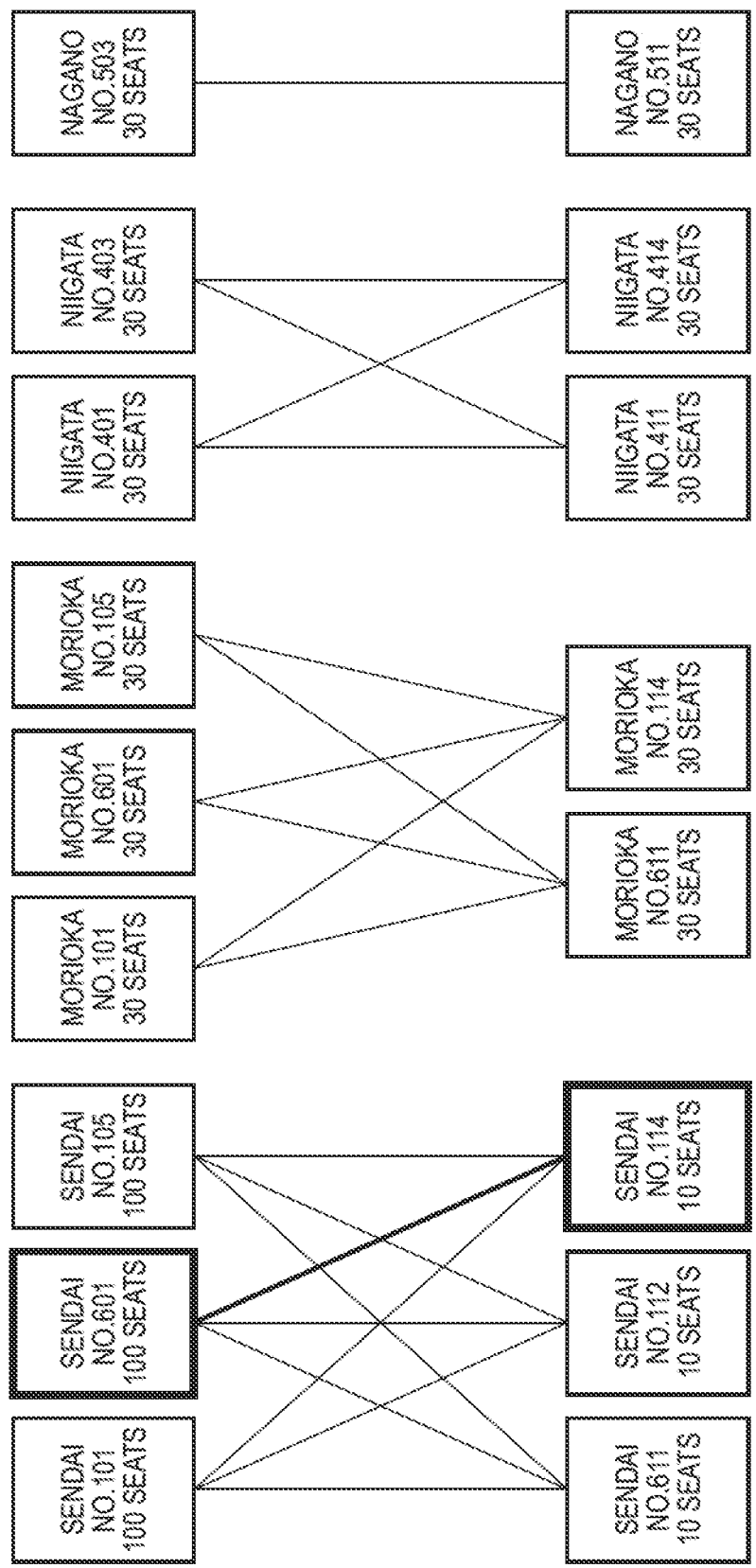
FIG. 15 is a view showing the outline of an example in which the order of outward/return trains is decided from the combinations of trains on the outward trip and the return trip by a first method according to the embodiment of the present invention.

FIG. 15 is a view showing the outline of an example in which the order of outward/return trains is decided from the combinations of trains on the outward trip and the return trip by the first method according to the embodiment of the present invention. In the example shown in FIG. 15, for the descriptive convenience, each of the trains on the outward trip and the return trip is assumed to have the number of stock seats as shown in FIG. 15, unlike the number of stock seats in the example of the combinations of the trains on the outward trip and the return trip shown in FIG. 14.

In the first method, first, one outward train as a target is selected from the outward trains on the upper stage in FIG. 15, like the 0th method. At this time, the decision is made in consideration of the weight set in accordance with the number of stock seats of each train. In the example shown in FIG. 15, a thick frame indicates that "No. 601" of the trains which stop at Sendai Station and whose number of stock seats is as large as 100 as compared to the remaining outward trains is drawn by lottery/selected. Next, from the return trains on the lower stage, which are combined with the selected outward train, one train is selected in consideration of the weight set in accordance with the number of stock seats, thereby defining the outward/return trains of the first order. In the example shown in FIG. 15, a thick frame indicates that "No. 114" of the return trains which stop at Sendai Station and whose number of stock seats is 10 is drawn by lottery/selected. Processing of selecting the outward/return trains of the next order by performing the same processing as described above for the remaining combinations of outward/return trains is sequentially repeated until no combination of outward/return trains remains.

In the above-described first method, whether the number of stock seats is large or small can be taken into consideration using the weight. However, for example, if the bias of the number of stock seats between the outward trains and the return trains, or the bias of the number of stock seats between the trains on the outward trip and the bias of the number of stock seats between the trains on the return trip are large, it may be impossible to appropriately evaluate the number of stock seats, resulting in inefficient sales. For example, in Sendai Station of the example shown in FIG. 15, the total number of stock seats (the number of vacant seats) of the three trains on the outward trip is as large as 300. However, the total number of stock seats of the three trains on the return trip is only 30, and a large bias exists. In this case, the number of persons who can make a round trip to Sendai Station using these trains is only 30 at maximum. That is, the transport capacity from the viewpoint of the round trip to Sendai Station is 30 seats.

To the contrary, in Nagano Station of the example shown in FIG. 15, the number of stock seats of one train on the outward trip is 30. The number of stock seats is much smaller than in Sendai Station. However, the number of stock seats of one train on the return trip is 30, too. Hence, the transport capacity is 30 seats, which is the same as in Sendai Station. Thus, even though the transport capacity on the outward/return trips is the same, a train in Sendai Station where the number of stock seats of outward trains is large is readily selected at an overwhelmingly high probability in lottery for the outward trains, resulting in inefficient sales. Depending on the station, as in the above-described example, for example, the number of vacant seats is relatively large in a train during the daytime on weekdays, and a train in the Friday evening is usually almost completely full, that is, a large bias may exist in the number of stock seats.

To solve the inefficiency caused by the bias in the number of stock seats between the outward trains and the return trains for each candidate station, it can be considered that the weight is set in consideration of the numbers of stock seats of the outward/return trains (this method is defined as the "second method"). That is, for each combination of outward/return trains in the candidate train list as shown in the example of FIGS. 13A and 13B, the smaller one of the numbers of stock seats of the trains on the outward trip and the return trip is defined as the number of stock seats (the number of outward/return stock seats) of the outward/return trains. The number of outward/return stock seats is used as the weight for each outward/return train, and the priority order is drawn by lottery/decided.

Figure 16:
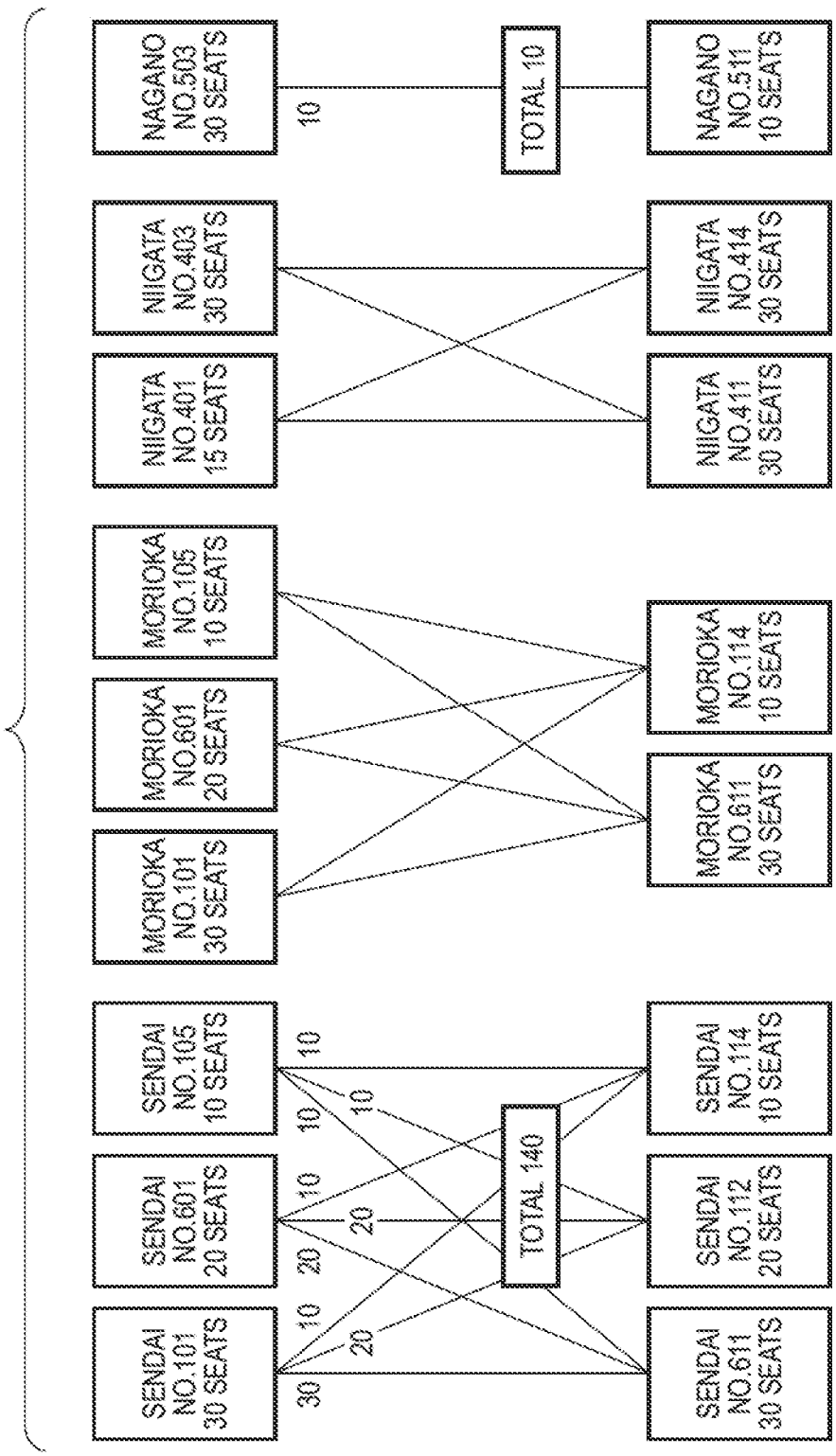
FIG. 16 is a view showing the outline of an example in which the order of outward/return trains is decided from the combinations of trains on the outward trip and the return trip by a second method according to the embodiment of the present invention.

FIG. 16 is a view showing the outline of an example in which the order of outward/return trains is decided from the combinations of trains on the outward trip and the return trip by the second method according to the embodiment of the present invention. In the example shown in FIG. 16, the numbers of stock seats are the same as the numbers of stock seats in the example of the combinations of trains on the outward trip and the return trip shown in FIG. 14. FIG. 16 shows, for each of Sendai Station and Nagano Station, the number of outward/return stock seats of each outward/return train to the station. Since the weight based on the number of outward/return stock seats is set for each outward/return train, the inefficiency caused by the bias in the number of stock seats between the outward trip and the return trip can be solved. In addition, a combination for which the number of stock seats in the outward/return trains is large (a combination for which the number of outward/return stock seats is large) is selected by lottery with a high priority order, and the stock can efficiently be sold to the last.

The example of FIG. 16 shows that the total number of outward/return stock seats of all outward/return trains (nine patterns) for Sendai Station is 140, and the total number of outward/return stock seats of all outward/return trains (one pattern) for Nagano Station is 10. That is, as Sendai Station, a weight of 140 is set in total for all outward/return trains, and as Nagano Station, a weight of 10 is set in total for all outward/return trains. Hence, in a lottery for deciding the order of each outward/return train by the second method, the probability of selecting one of the outward/return trains for Sendai Station is 14 times greater than the probability of selecting an outward/return train for Nagano Station. The probability of selecting Sendai Station as the final destination is 14 times greater than the probability of selecting Nagano Station.

However, if the transport capacity for each station as described above is taken into consideration, the total transport capacity in Sendai Station is 30+20+10=60 seats. On the other hand, the transport capacity in Nagano Station is 10 seats, and the ratio of transport capacities as stations is only 6:1. That is, for a station for which many combinations of outward/return trains exist, like Sendai Station, a large weight is set for the station, as compared to the bias of the transport capacity. As a result, Sendai Station is readily selected as the final destination by lottery.

Hence, the second method is effective if outward/return trains for a station for which many combinations of outward/return trains exist (that is, a station from/at which a large number of trains depart/arrive, or a station used by many passengers) should preferentially be sold. Note that even in the station for which many combinations of outward/return trains exist, the combinations of outward/return trains decrease along with an increase in the number of trains whose stock is reduced (sold out). For this reason, a state in which a large weight is set for the whole station (that is, the stock is easily sold) is relaxed.

On the other hand, not only the bias of the number of stock seats for each station but also the bias of the number of stock seats of each outward/return train in the station is preferably taken into consideration. FIG. 17 is a view showing the outline of an example in which an order is decided for a plurality of outward/return trains in the same station according to the embodiment of the present invention. For example, assume a case where in a state in which for a given station, candidates of outward trains are three trains shown on the upper stage, and candidates of return trains are three trains shown on the lower stage, target outward/return trains are drawn by lottery/selected from the outward/return trains of these combinations. In this case, in the second method described above, the number of outward/return stock seats of each outward/return train is corrected to 10 that is the smaller number of stock seats. Hence, the weight set for each outward/return train based on the number of outward/return stock seats, that is, the lottery probability in deciding the priority order has an even value.

However, in the example of FIG. 17, only "No. 111" on the return trip has stock of 80 seats (vacant seats), unlike the other trains each having 10 vacant seats. It is therefore considered that according to an actual situation, the lottery probability of selecting "No. 111" as the return trip when deciding the priority order can be set to 8 times greater than that for the remaining trains. That is, in the second method, if the number of stock seats is small in general for all outward trains (or return trains) in a given station, and the number of stock seats is large in general for the return trains (or outward trains), like the example of FIG. 17, the distribution or bias of the number of stock seats of the return trains (or outward trains) is not reflected on the weight used to decide the outward/return trains.

Hence, it can be considered that while avoiding the weight from being set large for the station for which many combinations of outward/return trains exist, the weight is set in consideration of the distribution or bias of the number of stock seats of outward trains and return trains in each station (this method is defined as the "third method"). That is, for each combination of outward/return trains in the candidate train list as shown in the example of FIGS. 13A and 13B, the numbers of stock seats of trains on the outward trip and the return trip are multiplied, and the resultant value is set to an intra-station round-trip-specific weight. In addition, for each station, the total number of stock seats of the trains on the outward trip and the total number of stock seats of the trains on the return trip are calculated, and the smaller one of the total numbers of stock seats (that is, the transport capacity in each station) is set to a station-specific weight. The calculated intra-station round-trip-specific weight and station-specific weight are multiplied for each outward/return train to calculate a round-trip-specific weight. Lottery/selection is performed based on the round-trip-specific weight, thereby deciding the priority order of each outward/return train.

Figure 18:
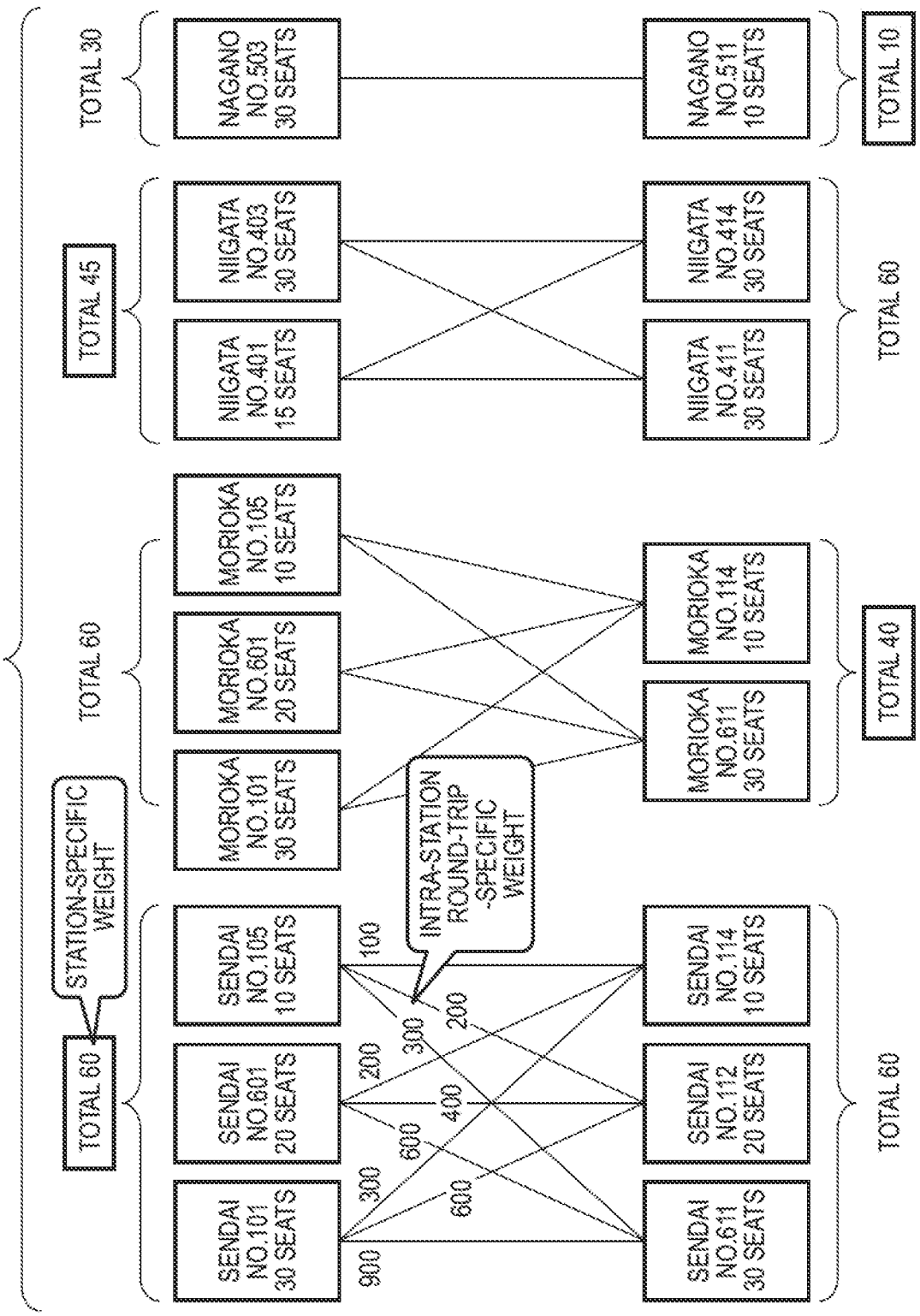
FIG. 18 is a view showing the outline of an example in which the order of outward/return trains is decided from the combinations of trains on the outward trip and the return trip by a third method according to the embodiment of the present invention.

FIG. 18 is a view showing the outline of an example in which the order of outward/return trains is decided from the combinations of trains on the outward trip and the return trip by the third method according to the embodiment of the present invention. In the example shown in FIG. 18, the numbers of stock seats are the same as the numbers of stock seats in the example of the combinations of trains on the outward trip and the return trip shown in FIG. 14. FIG. 18 shows, for Sendai Station, the intra-station round-trip-specific weight calculated for outward/return trains. Also, for each station, the total numbers of stock seats for the outward trip and the return trip are shown, and the smaller one of them is set to the station-specific weight.

How the lottery probability for deciding the priority order of each outward/return train is calculated in a case where a weight is set by the above-described third method will be described below. FIGS. 19A and 19B are views showing the outline of an example of the lottery probability in a case where a weight is set for each train by the above-described first method for the sake of comparison. FIGS. 19A and 19B show a case where, for each of the outward trip (FIG. 19A) and the return trip (FIG. 19B), the lottery probability is calculated by setting the number of stock seats for a one-way trip of each train to a weight if the outward/return candidate train list created in step S51 of FIG. 7 is that of the example shown in FIGS. 13A and 13B (and FIG. 14).

Here, for each of the outward trip and the return trip, a value obtained by simply apportioning the lottery probability, which is 100% for the total number of stock seats (outward trip=195, return trip=170) of all candidate trains of all candidate stations, by the number of stock seats of each train is set as a lottery probability. In the first method, the priority orders of outward/return trains are decided by the combinations of outward trains and return trains sequentially drawn by lottery based on the lottery probabilities.

FIGS. 20A to 20D are views showing the outline of an example of lottery probabilities in a case where a weight is set for each train by the third method according to the embodiment of the present invention. FIGS. 20A to 20D show an example in which, for each of the four candidate stations (Sendai Station, Morioka Station, Niigata Station, and Nagano Station), the above-described intra-station round-trip-specific weight and the station-specific weight are multiplied to calculate a round-trip-specific weight if the outward/return candidate train list created in step S51 of FIG. 7 is that of the example shown in FIGS. 13A and 13B (and FIG. 14).

In each of FIGS. 20A to 20D, the first term on the left-hand side shows, as intra-station round-trip-specific weights, results of multiplying a matrix formed by all combinations of outward trains and return trains in the target station by the numbers of stock seats. In each cell, a value obtained by multiplying the numbers of stock seats is shown on the upper stage, and the ratio of the value to the total value in the target station is shown as a percentage on the lower stage (the percentage value on the lower stage is used in the following operation).

In addition, the second term on the left-hand side shows the station-specific weight of each station shown in FIG. 18 (in the example of FIG. 18, 60 in Sendai Station, 40 in Morioka Station, 45 in Niigata Station, and 10 in Nagano Station) as the ratio to the total weight (60+40+45+10=155) in all the stations. The right-hand side shows, in a matrix formed by the combinations of outward trains and return trains, round-trip-specific weights obtained as the calculation result of the left-hand side. Note that if the round-trip-specific weights of all outward/return trains of each of the stations shown in FIGS. 20A to 20D are totalized, a value of 100% is obtained. In the third method, lottery is sequentially performed using the round-trip-specific weight as a lottery probability, thereby deciding the priority orders of outward/return trains.

In the third method, the lottery probability is distributed on a station basis by the station-specific weight (that is, the above-described transport capacity). This makes it possible to more appropriately sell the stock in accordance with the number of stock seats in each station than in the second method even if, for example, there is a station with a large number of stock seats and many combinations of outward/return trains. That is, preferentially selling a train that stops at a station with many combinations of outward/return trains is avoided. If the number of stock seats (transport capacity) for a round trip in each station is the same, it is possible to prevent the priority level (lottery probability) from being affected by the number of combinations of outward/return trains.

Also, in the same station, since the lottery probability is distributed by the intra-station round-trip-specific weight obtained by multiplying the numbers of stock seats for each round trip, trains with a surplus in stock (with a large number of stock seats) as outward/return trains are readily sold, and the stock can efficiently be sold to the last. In addition, the lottery probability is distributed in accordance with the ratio of number of stock seats of each of the outward trip and the return trip, and the stock can more appropriately be sold.

Note that the third method uses the intra-station round-trip-specific weight obtained by multiplying the numbers of stock seats for each round trip and is substantially equivalent to individually performing lottery/selection/combination for each of the outward trip and the return trip, as in the above-described first method. Hence, any method can be used. In the latter method for individually performing lottery/selection/combination for each of the outward trip and the return trip, calculation of the intra-station round-trip-specific weight is unnecessary. However, when ranking all combinations, negation processing considering the combinations needs to be performed, and this may lead to inefficient processing.

FIGS. 21A and 21B are views showing the outline of an example of lottery probabilities in a case where a weight is set for each train by the third method according to the embodiment of the present invention. FIGS. 21A and 21B show the results of totaling, for each train, the lottery probabilities (the round-trip-specific weights on the right-hand side) of the outward/return trains shown in FIGS. 20A to 20D for each of the outward trip (FIG. 21A) and the return trip (FIG. 21B). As described above, the third method is equivalent to individually performing lottery/selection of trains for the outward trip and the return trip based on the lottery probabilities as shown in FIGS. 21A and 21B and combining these to decide outward/return trains.

If the lottery probabilities shown in FIGS. 21A and 21B, which are decided by the third method, are compared with the lottery probabilities shown in FIGS. 19A and 19B, which are decided by the first method, it is found that in the example shown in FIGS. 21A and 21B, the lottery probabilities are corrected based on the balance of the numbers of stock seats between the stations and the balance of the numbers of stock seats on each of the outward trip and the return trip. For example, in the example shown in FIG. 21A, for "No. 101 to arrive at Sendai Station" and "No. 101 to arrive at Morioka Station" which are outward trains each having 30 stock seats, the lottery probabilities are adjusted by the numbers of stock seats of return trains of each station, and the former has a higher lottery probability.

Note that in this embodiment, an element selected by lottery from a plurality of trains of different lottery probabilities (or weights) is sequentially extracted and ranked. The method is not particularly limited, and an arbitrary method including known methods can be used.

Figure 22:
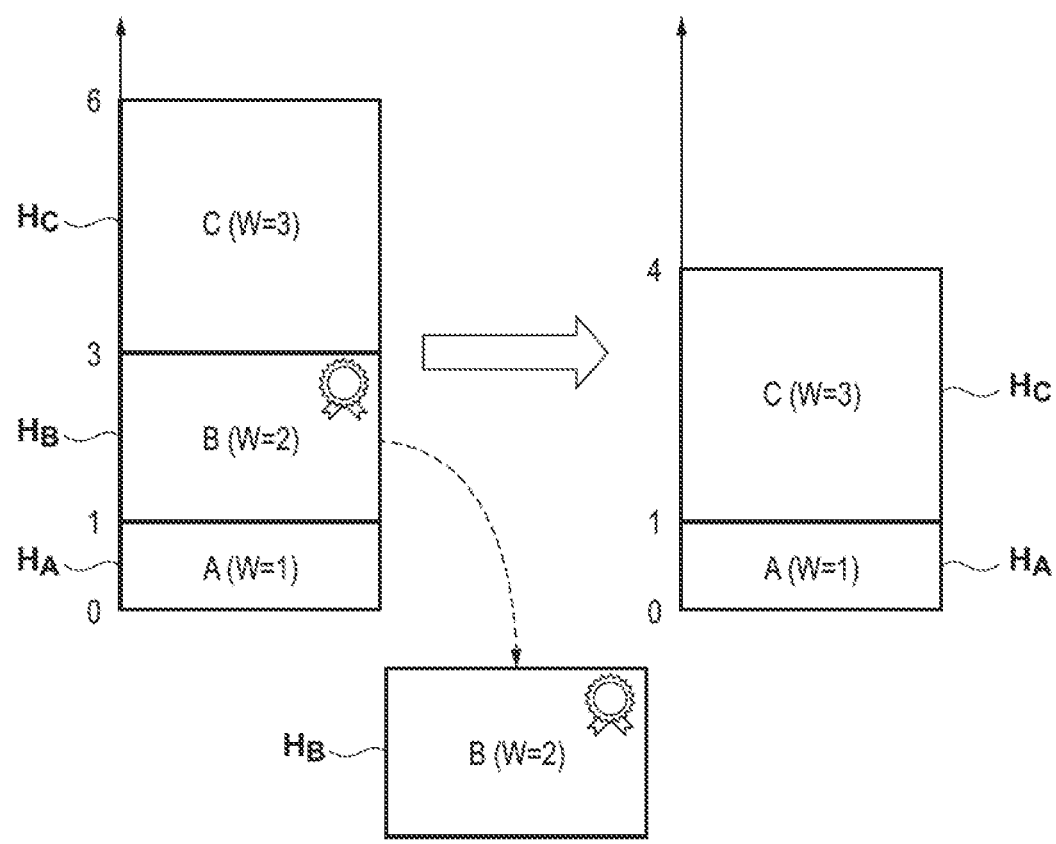
FIG. 22 is a view showing the outline of an example of a priority order decision method when the lottery probability for each outward/return train is decided according to the embodiment of the present invention.

FIG. 22 is a view showing the outline of an example of a priority order decision method when the lottery probability for each outward/return train is decided according to the embodiment of the present invention. For example, when ranking three elements A, B, and C, assume that the lottery probabilities are W=1, 2, 3. As shown in the view on the left side, a winning range $H_A$ of the element A is set to $0<HA \le 1$, a winning range $H_B$ of the element B is set to $1<HB \le 3$, and a winning range $H_C$ of the element C is set to $3<HC \le 6$. Note that the arrangement order of winning ranges H is not limited to this, and an arbitrary order can be set.

After that, a random number value P is generated within the range of $0<P \le 6$, and an element corresponding to the winning range H to which P belongs is assumed to win. The example of FIG. 22 shows that the element B wins. After that, the element B that has won is added to the end of the order list, and the winning range $H_B$ is removed. As shown in the view on the right side, the winning range is reconfigured by filling the gap of the portion of the winning range $H_B$, and the next lottery is performed. At this time, the range of the random number value P to be generated by the next lottery is $0<P \le 4$. The winning range H of the element that has won is sequentially removed in this way, and the lottery is repeated until all winning ranges H are removed, thereby obtaining an order list as the result of ranking all elements.

In the above-described first to third methods, the priority orders are decided in the whole of all candidate station lists in the four candidate stations as shown in the example of FIGS. 13A and 13B (the priority orders may be set only for a predetermined number of high-rank items). Then, in application processing to be described later, a destination and outward/return trains are preferentially decided sequentially from the highest rank. If this method is employed, candidate trains that stop at largely weighted candidate stations may be concentrated to higher priority orders, and the probability that these are listed may be high. Hence, a case where stations (routes) finally decided as the destination are biased to specific stations may occur. Also, a specific train (on the outward trip or return trip) is often included in the outward/return trains listed to higher priority orders. A case where if the concerned train is not available because, for example, all seats are reserved, all the outward/return trains of higher ranks, including the concerned train, are unusable readily occurs.

To reduce such a bias, it can be considered that a high-rank candidate train list is created by extracting the outward/return train of the highest priority order from the corresponding outward/return trains for each of the four candidate stations (routes), a priority order is decided, based on a lottery probability weighted using a weight, for each of the outward/return trains concerning the four candidate stations included in the high-rank candidate train list, and a destination and outward/return trains are preferentially decided sequentially from the highest rank (this method is defined as the "fourth method").

According to the fourth method, since the four outward/return trains included in the high-rank candidate train list correspond to the four candidate stations, respectively, a bias of a final destination decided in these to a specific station can be reduced. In this embodiment, a description will be made below assuming that the fourth method is employed. That is, after the priority orders of outward/return trains are decided in step S52 of FIG. 7, based on these, a high-rank candidate train list is created by extracting and collecting the outward/return trains of the highest priority order for each candidate station (step S53).

FIG. 23 is a view showing an example in which the order of outward/return trains is decided from the combinations of trains on the outward trip and the return trip by the fourth method according to the embodiment of the present invention. The view on the left side of FIG. 23 shows that, for the four candidate stations (the V station, the W station, the X station, and the Y station in the example of FIG. 23), priority orders are decided for the combinations of corresponding candidate trains on the outward trip and the return trip. A high-rank candidate train list created by extracting the and collecting the trains of the highest priority order from the list of candidate trains of each candidate station is shown on the right side of FIG. 23. A priority order is further decided for each of the four outward/return trains included in the high-rank candidate train list based on the weight (priority level), and a destination and outward/return trains are preferentially decided sequentially from the highest rank.

Note that the creation method of the candidate train list for each candidate station shown on the left side of FIG. 23 is not particularly limited. For example, after the whole priority orders are decided for the candidate train lists of all the four candidate stations by the above-described first to third methods in step S52 of FIG. 7, the trains are separated for each candidate station and listed while maintaining the order, thereby obtaining the candidate train lists. Alternatively, a candidate train list including the outward/return trains of all candidate stations as shown in the example of FIGS. 13A and 13B may be separated first for each candidate station to form individual candidate train lists. Then, priority orders may be decided for the candidate train list of each candidate station by the above-described first or second method.

In the above-described fourth method, the high-rank candidate train list as the target to decide the final destination includes one outward/return train for each of the four candidate stations. For example, if all the four candidate stations exist on the same route (for example, the Tokaido/Sanyo Shinkansen whose departure station is Tokyo Station), a definite midway stop station may occur for each outward/return train in the high-rank candidate train list.

Hence, in the fourth method, for the outward/return trains in the high-rank candidate train list, that is, a total of eight trains including four outward trains and four return trains associated with the candidate stations, it is checked whether a common definite stop station exists. If a stop station common to all the total of eight trains including the four outward trains and the four return trains exists, the result is NG, as a matter of course. It is also preferably checked whether a stop station common of all the four outward trains or the four return trains exists. This can prevent a use method of purchasing a normal train ticket for one of the outward/return trips, in which no common stop station exists, and definitely going to a concerned stop station using a cheap train ticket. How to handle a stop station common to all the four trains, which exists on one of the outward trip and the return trip, is not particularly limited, and can appropriately be decided in accordance with the contents of the service.

For the four candidate trains associated with the four candidate stations, a stop station common to all the trains exists on at least one of the outward trip and the return trip. Hence, if this is NG, one of the four candidate trains having the common stop station is replaced with another outward/return train, and check is performed again, thereby searching for a combination of candidate trains that have no common stop station.

For example, for each of the four candidate trains in the high-rank candidate train list (the table on the right side of FIG. 23), the train of the next rank is extracted from the candidate train list (the table on the left side of FIG. 23) associated with the target candidate station, and the candidate train is replaced with it. It is then checked whether a common stop station is absent. If a common stop station still exists, the train is replaced with the train of the next rank. This processing is repeated until a common stop station is eliminated. If a common stop station is absent, the difference of priority level between the first candidate train and the replaced outward/return train (how much the priority level has lowered by the replacement) is calculated. Of the four candidate trains, the pattern that has the smallest priority level difference when a common stop station is eliminated by the replacement is employed. This makes it possible to eliminate a stop station at which a train definitely stops while maintaining the sum of priority levels as large as possible.

In place of the above-described method in which after the high-rank candidate train list is created, the presence/absence of a common stop station is checked, and if a common stop station exists, one candidate train is replaced, for example, when creating the high-rank candidate train list, all combinations may be created based on the candidate train list of each stop station independently of the priority level, the presence/absence of a common stop station may then be checked for each combination, and the combination with the largest sum of priority levels of outward/return trains may be selected as the high-rank candidate train list from the combinations without a common stop station.

Note that even if such candidate train replacement is performed, in some cases, the existence of a common stop station cannot be avoided depending on conditions such as the configuration of routes, the stop stations of each train, and the number of stock seats. Hence, it is checked whether a combination that does not include a stop station common to all outward/return trains could be created in the above-described high-rank candidate train list creation (step S53 of FIG. 7) (step S54 of FIG. 7). If a definite stop station common to all outward/return trains exists (NO in step S54), the process returns to step S40 to repeat the processing again from candidate station list creation.

At this time, instead of selecting all candidate stations anew, adjustment is done by replacing one of the stations of each candidate route included in the candidate station list already created in step S40 with another station. A method of checking whether a common stop station is absent by round robin for the combinations of all stop stations included in the applicable stop station list created in step S22 can also be considered. However, this is not preferable because the calculation amount is enormous. In addition, the four candidate stations included in the candidate station list created in step S40 are selected based on weights that are set in consideration of circumstances such as the number of stock seats and a campaign. If these are reset, and candidate stations are selected on a zero basis such that a common stop station is not included, the purpose or effect of reduction of the number of stock seats and the campaign cannot sufficiently be obtained.

In this embodiment, when performing adjustment by replacing one of the candidate stations included in the candidate station list in step S40 with another station, of the stop stations common to all the candidate trains associated with the four candidate stations, a stop station before the stop station closest to the departure station (close to the departure station) is selected as a new candidate station. For example, if the four candidate stations are Osaka Station, Kyoto Station, Gifu-Hajima Station, and Nagoya Station in the Tokaido/Sanyo Shinkansen having Tokyo Station as the departure station, Nagoya Station is a definite common stop station independently of candidate trains associated with the candidate stations. In this case, even if one of the candidate stations is replaced with a station farther from Nagoya station when viewed from Tokyo Station, Nagoya Station still remains the definite common stop station, and it makes no sense.

However, if one of the candidate stations is replaced with a station (for example, Shizuoka Station) before Nagoya station, the definite common stop station can be avoided. Even in the same Tokaido/Sanyo Shinkansen, the stop pattern changes depending on the train, and a station at which a train does not always definitely stop, like Shizuoka Station, can be selected. Note that in this case, as for which one of the four candidate stations should be replaced, for example, a station for which a weight set for each candidate stations, like the station-specific weight in the above-described third method, is small is preferentially selected, thereby performing replacement in consideration of the number of stock seats or the presence/absence of a campaign.

Note that since the number of stations is limited, in place of the above-described method in which after four candidate stations are selected, one of these is replaced if there is a stop station common to candidate trains, for example, combinations of candidate stations without a definite common stop station may be calculated in advance and held as data, and when creating the candidate station list in step S40, it may be selected from the combinations.

Referring back to FIG. 7, if a stop station common to all outward/return trains does not exist in step S54 (YES in step S54), the information of the four candidate stations included in the high-rank candidate train list created in step S53 is displayed on the user terminal 40 by the screen as shown in FIG. 3 described above (step S55).

After that, the user judges whether to make an application of the trip. If the application is not made (if the screen transitions to another screen, or the application is ended), the search conditions input in step S10 and the information of the candidate station list created in step S40 may be stored using the Cookie, or the like, as described above. On the other hand, if the user makes the application, an application request from the user terminal 40 is accepted via the screen as shown in FIG. 4 described above, and application processing is performed (step S60). Then, the series of processes is ended.

In the application processing, for example, the pieces of information of the candidate station list created in step S40, the list of priority orders of outward/return trains decided in step S52, the high-rank candidate train list created in step S53, and the like are recorded in the application DB 17. Then, in this embodiment, for the outward/return trains recorded at the top of the high-rank candidate train list, reservation processing is actually performed via the reservation processing unit 21 of the railway company system 20, and the number of stock seats is decremented (or the number of sold seats is incremented). As described above, if there is an insufficient stock of seats in actual reservation processing in the railway company system 20, the reservation processing is performed for outward/return trains recorded as the next rank of the high-rank candidate train list instead. In this embodiment, the information of the actually reserved outward/return trains is notified to the user via the screen as shown in FIG. 5 four days before the departure date.

Note that in this embodiment, as indicated by the screen examples shown in FIGS. 3 and 4, four candidate stations are presented to the user. However, the contents of the candidate trains associated with each candidate station are not presented. Hence, a definite common stop station is formally absent for the user unless a stop station common to all trains that stop at each candidate station exists.

On the other hand, assume that although almost all trains commonly stop at a certain station, some trains in some rare stop patterns do not stop at the concerned station. In this case, even if only one rare train is included in the candidate train list for the concerned station, it is formally not a definite common stop station. However, if the user does not know the existence of such a rare train, it appears for the user that there is a definite common stop station. In addition, since almost all trains stop at the concerned station, it is essentially an almost definite common stop station. It is therefore impossible to avoid the user using the service aiming at definitely making a stopover at the concerned station.

Even in the above-described case, however, in this embodiment, to eliminate the definite common stop station, a train of a rare stop pattern is included in the four candidate trains of the high-rank candidate train list. As a result, a stop station associated with the concerned train is selected as the destination in some cases. In this case, the user who recognizes that a definite stop station exists is outwitted. If such a case is spread on the Internet, it is possible to check/suppress the act aiming at a definite common midway stop station.

Also, in this embodiment, only the four candidate stations are presented to the user. However, outward/return trains corresponding to the candidate stations can also be presented. In this case, since the user can know that the combination does not include a definite midway stop station by, for example, referring to a time table available to the public, the purpose of suppressing an act aiming at this can sufficiently be achieved.

As described above, according to the vehicle use ticket assignment system 1 that is the embodiment of the present invention, it is possible to implement a destination proposal type sales method in which the system automatically decides, by lottery, a final destination and outward/return trains from a plurality of destination candidates extracted based on conditions input by the user. At this time, it is possible to preferentially select candidate sites of the seller's desire and promote sales of stock. In addition, it is possible to provide, to the user, an experience of unexpectedness and expectation for a trip by solving the problem that a midway stop station definitely common to a plurality of destination candidates may occur due to the characteristic unique to the railway that allows the user to make a stopover.

When selecting a plurality of candidate sites (candidate stations) or deciding the station of the final destination and the outward/return trains, weighting is performed by setting weights based on various kinds of parameters including the numbers of stock seats of outward trains and return trains and the number of stock seats in each station, and the trains are sold in descending order of priority order. This makes it possible to efficiently and effectively promote sales of stock.

Note that as described above, unlike an airplane in which all seats are basically reserved seats, non-reserved seats exist in the railway, and in some cases, the stock is not/cannot taken into consideration in sales of train tickets. Hence, the number of stock seats may not be taken into consideration as a parameter used to decide the priority order. In addition, from the viewpoint of preventing occurrence of a midway stop station definitely common to the plurality of destination candidates, it is not essential to set priority orders for the list of extracted candidate trains.

The present invention made by the present inventor has been described above in detail based on the embodiment. However, the present invention is not limited to the above-described embodiment, and various changes and modifications can be made without departing from the scope of the invention, as a matter of course. Also, the above embodiment has been described in detail to clearly explain the present invention, and need not always include all the described configurations. For some of the configurations of the above-described embodiment, addition/removal/replacement of another configuration may be done.

More specifically, for example, in the above embodiment, a case where an outward train and a return train between a departure station and an arrival station that is a destination are combined and sold as outward/return trains has been described as an example. However, the present invention is not limited to such a pattern and can also be applied to another pattern as needed. For example, if a station close to the destination exists, a so-called open-jaw ticket in which the arrival station of the outward train and the departure station of the return train are different (for example, Yamagata Station and Tendo Station) is also available. This also applies to a case where the departure station of the outward train and the arrival station of the return train are different. Furthermore, the concept "outward/return trip" according to the present embodiment encompasses a case of traveling by train on a route between and arrival station of an outward trip train and a departure station of a return trip train. Specifically, assuming that the departure station is station A, and the arrival station is station B of the outward trip train and the departure station of the return trip train is station X and the arrival station of the return trip train is station A, a case of traveling over a route from station B to station X after arriving at station B, and thereafter, returning to station A from station X is encompassed in "outward/return trip". Also, in the above-described embodiment, an example of a case of assigning a boarding ticket for an outward trip train and a return trip train to a user has been described. However, a ticket may be assigned to a user for only the boarding ticket for an outward trip train or only the boarding ticket for a return trip train. In the case of assigning a ticket only for the outward trip train, for example, there is no need to obtain return trip information on the condition input screen illustrated in FIG. 2. Also, the destination candidate extraction unit 12 may generate a list of stop stations by using a train list of only outward trips in preparation processing illustrated in step S20. Information of only stop stations of the outward trip (for example, the number of stock seats for the outward trip or the like) may be used when creating the candidate station list in step S40. The destination candidate extraction unit 12, in step S50, may generate an outward trip candidate train list and set a weight according to the number of stock seats for an outward trip train. Also, in the above-described embodiment, the Shinkansen has been described as a detailed example of a railway route. Limited express trains and conventional lines may also be included in the target, as a matter of course.

In addition, some or all of the above-described configurations, functions, processing units, processing means, and the like may be implemented by hardware by, for example, designing on an integrated circuit. Alternatively, the above-described configurations, functions, and the like may be implemented by software by a processor interpreting and executing programs configured to implement the functions. The information of programs, tables, files, and the like configured to implement the functions can be stored in a recording device such as a memory, a hard disk, or an SSD (Solid State Drive), or a recording medium such as an IC card, an SD card, or a DVD.

Additionally, the above drawings show control lines and information lines, which are considered as necessary for the description, and not all control lines and information lines in terms of implementation are always shown. In fact, it can be considered that almost all configurations are connected to each other. According to the representative embodiment of the present invention, in the mechanism configured to sell train tickets of a railway by a destination proposal type method, it is possible to extract destination candidates such that a midway stop station to which the user can definitely go by making a stopover does not occur.

What is claimed is:

1. A vehicle use ticket assignment system for assigning a vehicle use ticket for a vehicle for which there is at least one fixed route and there is a fixed get-on/off enable point on the route, the system comprising a server, the server comprising:
   a processor and
   a memory storing a program configured to be executed by the processor, wherein the program includes instructions for executing a method, the method comprising:
   receiving through a network, via a condition setting screen displayed on an information processing terminal, a condition that is from a user and that includes a departure point and does not include a designation of a destination;
   extracting a predetermined number of destination candidates that can be reached from the departure point by the at least one fixed route, wherein the predetermined number of destination candidates are extracted by the processor such that for all of the destination candidates, there is no shared get-on/off enable point on the route to the destination candidate;
   causing a screen displaying the extracted predetermined number of destination candidates to be displayed on the information processing terminal through the network; and
   after an application for a ticket for a vehicle is received through the network via a screen for ordering the ticket for the vehicle including the display of the predetermined number of destination candidates which is displayed on the information processing terminal, based on a predetermined criterion, automatically selecting and assigning to the user one of boarding tickets to each of the extracted predetermined number of destination candidates, wherein the extracting the predetermined number of destination candidates comprises:

reading from the memory a table defining, for each departure station, a get-on/off enable point for which a stopover is permitted that exists within a predetermined range of the departure station corresponding to the departure point, and excluding the get-on/off enable points, among the get-on/off enable points on the route to the destination candidate for which a stopover is permitted.

2. The vehicle use ticket assignment system according to claim 1, comprising:

extracting the predetermined number of destination candidates;

accumulating a distance from the departure point to a midway get-on/off enable point based on information of a distance between get-on/off enable points;

determining whether or not a result of the accumulating exceeds a predetermined distance threshold; and in a case where the result of the accumulating exceeds the predetermined distance threshold, excluding, from the get-on/off enable points on the route to the destination candidate, a get-on/off enable point that was a target of the accumulating other than the get-on/off enable point for which the distance was last added.

3. The vehicle use ticket assignment system according to claim 1, wherein the extracting the predetermined number of destination candidates comprises: excluding a get-on/off enable point, among the get-on/off enable points on the route, for which a stay time based on an arrival time at the get-on/off enable point on an outward trip and a departure time from the get-on/off enable point on a return trip is shorter than a shortest stay time at a destination stored in the memory.

4. The vehicle use ticket assignment system according to claim 1, wherein the extracting the predetermined number of destination candidates comprises:

obtaining from stock information stored in the memory information of applicable outward trips and applicable return trips matching the condition;

obtaining as applicable get-on/off enable points, get-on/off enable points that are common to an applicable outward trip and an applicable return trip;

selecting as candidate routes a predetermined number of routes from routes according to the applicable get-on/off enable points, and selecting from each of the candidate routes one candidate get-on/off enable point included in the applicable get-on/off enable points respectively;

select, from among candidate outward/return trips obtained by combining outward trips and return trips included in the applicable outward trips and the applicable return trips, respectively, which allow a passenger to get on/off at a respective candidate get-on/off enable point, one candidate outward/return trip for each candidate route based on a predetermined criterion and collect the candidate outward/return trips to obtain high-rank candidate outward/return trips, select one of the high-rank candidate outward/return trips based on a predetermined criterion as an assignment target outward/return trip, and decide the candidate get-on/off enable point corresponding to the assignment target outward/return trip as a destination candidate, wherein the extracting the predetermined number of destination candidates further comprises: if there is a definite common get-on/off enable point where a passenger can get on/off commonly to all outward trips and/or all return trips included in the high-rank candidate outward/return trips, replacing one of the high-rank candidate outward/return trips with another candidate outward/return trip associated with a corresponding candidate get-on/off enable point.

5. The vehicle use ticket assignment system according to claim 4, wherein extracting the predetermined number of destination candidates;

reading, from memory, branch data indicating a stop station that is a branch for each route, and identifying the stop stations that are branches in each of the selected candidate routes;

determining whether stop stations that are branches overlap in all of the candidate routes;

when it is determined that stop stations that are branches overlap, replacing one among the candidate routes with another route for which stop stations that are branches do not overlap.

6. The vehicle use ticket assignment system according to claim 4, wherein the extracting the predetermined number of destination candidates comprises: if the definite common get-on/off enable point exists for the high-rank candidate outward/return trips, and the definite common get-on/off enable point remains even after the one of the high-rank candidate outward/return trips is replaced with the other candidate outward/return trip associated with the corresponding candidate get-on/off enable point, replacing one of the candidate get-on/off enable points with another applicable get-on/off enable point of a corresponding candidate route.

7. The vehicle use ticket assignment system according to claim 6, wherein the extracting the predetermined number of destination candidates comprises replacing one of the candidate get-on/off enable points with an applicable get-on/off enable point closer to the departure point than the definite common get-on/off enable point closest to the departure point designated by the user.

* * * * *